United States Patent [19]
Hegland et al.

[11] Patent Number: 5,751,616
[45] Date of Patent: May 12, 1998

[54] MEMORY-DISTRIBUTED PARALLEL COMPUTER AND METHOD FOR FAST FOURIER TRANSFORMATION

[75] Inventors: Markus Hegland, O'Connor, Australia; Makoto Nakanishi, Kawasaki, Japan

[73] Assignees: Fujitsu Limited, Kawasaki, Japan; The Australian National University, Canberra, Australia

[21] Appl. No.: 701,165

[22] Filed: Aug. 21, 1996

[30] Foreign Application Priority Data

Nov. 29, 1995 [JP] Japan ..................... 7-311224

[51] Int. Cl.⁶ .......................... G06F 17/14; G06F 15/00
[52] U.S. Cl. ................... 364/725.02; 364/726.02
[58] Field of Search ............... 364/725.02, 726.02; 382/280

[56] References Cited

U.S. PATENT DOCUMENTS 5,042,000  8/1991  Baldwin .................. 364/726.02
5,481,487  1/1996  Jang et al. ............... 364/725.02
5,583,803 12/1996  Matsumoto et al. ......... 364/725.02

FOREIGN PATENT DOCUMENTS 56-17458   2/1981  Japan.
62-295174 12/1987  Japan.
3-262076  11/1991  Japan.

Primary Examiner—Tan V. Mai
Attorney, Agent, or Firm—Staas & Halsey

[57] ABSTRACT

Two-dimensional real number data are stored in a two-dimensional array spanning plural processors. Each subarray in each processor is divided into two sets of row vectors and one set is referred to as a real part while the other set is referred to as an imaginary part. A result of a real Fourier transformation with respect to columns performed on each row vector is obtained after performing a complex Fourier transformation in each processor. Then, the two-dimensional array is transposed by transferring data in parallel to perform a complex Fourier transformation with respect to rows, the result of which is transposed again to obtain a result of a two-dimensional Fourier transformation. The Fourier transformations can be performed in the closed state in each processor, thereby greatly improving an efficiency of the entire process.

13 Claims, 24 Drawing Sheets

REAL PART, IMAGINARY PART OF A

| | | ←――――――16――――――→ | | |
|---|---|---|---|---|
| PE1 | 3 { | x(1,1), x(1,2),<br>x(2,1),<br>x(3,1), | ―――― <br> ―――― <br> ―――― | x(1,15), *<br>x(2,15), *<br>x(3,15), * |
| PE2 | 3 { | x(7,1),<br>x(8,1),<br>x(9,1), | ―――― <br> ―――― <br> ―――― | x(7,15), *<br>x(8,15), *<br>x(9,15), * |
| PE3 | 3 { | x(13,1),<br>x(14,1),<br>x(15,1), | ―――― <br> ―――― <br> ―――― | x(13,15), *<br>x(14,15), *<br>x(15,15), * |
| PE4 | 3 { | x(19,1),<br>x(20,1),<br>* , | ―――― <br> ―――― <br> ―――― | x(19,15), *<br>x(20,15), *<br>* , * |

(vertical dimension: 12)

BI

| | | | | |
|---|---|---|---|---|
| PE1 | 3 { | x(4,1), x(4,2),<br>x(5,1),<br>x(6,1), | ―――― <br> ―――― <br> ―――― | x(4,15), *<br>x(5,15), *<br>x(6,15), * |
| PE2 | 3 { | x(10,1),<br>x(11,1),<br>x(12,1), | ―――― <br> ―――― <br> ―――― | x(10,15), *<br>x(11,15), *<br>x(12,15), * |
| PE3 | 3 { | x(16,1),<br>x(17,1),<br>x(18,1), | ―――― <br> ―――― <br> ―――― | x(16,15), *<br>x(17,15), *<br>x(18,15), * |
| PE4 | 3 { | * ,<br>* ,<br>* | ―――― <br> ―――― <br> ―――― | * , *<br>* , *<br>* , * |

(vertical dimension: 12)

|     |                    |       |               |
|-----|--------------------|-------|---------------|
| PE1 | x(1,1), x(1,2),    | ----  | x(1,15), *    |
|     | x(2,1),            | ----  | x(2,15), *    |
|     | x(3,1),            | ----  | x(3,15), *    |
| PE2 | x(7,1),            | ----  | x(7,15), *    |
|     | x(8,1),            | ----  | x(8,15), *    |
|     | x(9,1),            | ----  | x(9,15), *    |
| PE3 | x(13,1),           | ----  | x(13,15), *   |
|     | x(14,1),           | ----  | x(14,15), *   |
|     | x(15,1),           | ----  | x(15,15), *   |
| PE4 | x(19,1),           | ----  | x(19,15), *   |
|     | x(20,1),           | ----  | x(20,15), *   |
|     | *  ,               | ----  | *  , *        |

Width: 16, Height: 12, REAL PART

BI

|     |                    |       |               |
|-----|--------------------|-------|---------------|
| PE1 | x(4,1), x(4,2),    | ----  | x(4,15), *    |
|     | x(5,1),            | ----  | x(5,15), *    |
|     | x(6,1),            | ----  | x(6,15), *    |
| PE2 | x(10,1),           | ----  | x(10,15), *   |
|     | x(11,1),           | ----  | x(11,15), *   |
|     | x(12,1),           | ----  | x(12,15), *   |
| PE3 | x(16,1),           | ----  | x(16,15), *   |
|     | x(17,1),           | ----  | x(17,15), *   |
|     | x(18,1),           | ----  | x(18,15), *   |
| PE4 | *                  | ----  | *  , *        |
|     | *                  | ----  | *  , *        |
|     | *                  | ----  | *  , *        |

Height: 12, IMAGINARY PART

REAL PART      IMAGINARY PART

| | ←——8——→ | ←——8——→ |
|---|---|---|
| PE1 | Re(α(1,1)), - - -, Re(α(1,8))<br>⋮<br>Re(α(6,1)), - - -, Re(α(6,8)) | Im(α(1,1)), - - -, Im(α(1,8))<br>⋮<br>Im(α(6,1)), - - -, Im(α(6,8)) |
| PE2 | Re(α(7,1)), - - -, Re(α(7,8))<br>⋮<br>Re(α(12,1)), - - -, Re(α(12,8)) | Im(α(7,1)), - - -, Im(α(7,8))<br>⋮<br>Im(α(12,1)), - - -, Im(α(12,8)) |
| PE3 | Re(α(13,1)), - - -, Re(α(13,8))<br>⋮<br>Re(α(18,1)), - - -, Re(α(18,8)) | Im(α(13,1)), - - -, Im(α(13,8))<br>⋮<br>Im(α(18,1)), - - -, Im(α(18,8)) |
| PE4 | Re(α(19,1)), - - -, Re(α(19,8))<br>Re(α(20,1)), - - -, Re(α(20,8))<br>∗ - - - ∗<br>⋮<br>∗ - - - ∗ | Im(α(19,1)), - - -, Im(α(19,8))<br>Im(α(20,1)), - - -, Im(α(20,8))<br>∗ - - - ∗<br>⋮<br>∗ - - - ∗ |

Total height: 24

FIG. 15

| | REAL PART | A | IMAGINARY PART |
|---|---|---|---|

|   | ←—— 8 ——→ | ←—— 8 ——→ |
|---|---|---|
| PE1 | Re(α'(1,1)), - - - ,Re(α'(1,8))<br>⋮<br>Re(α'(6,1)), - - - ,Re(α'(6,8)) | Im(α'(1,1)), - - - ,Im(α'(1,8))<br>⋮<br>Im(α'(6,1)), - - - ,Im(α'(6,8)) |
| PE2 | Re(α'(7,1)), - - - ,Re(α'(7,8))<br>⋮<br>Re(α'(12,1)), - - - ,Re(α'(12,8)) | Im(α'(7,1)), - - - ,Im(α'(7,8))<br>⋮<br>Im(α'(12,1)), - - - ,Im(α'(12,8)) |
| PE3 | Re(α'(13,1)), - - - ,Re(α'(13,8))<br>⋮<br>Re(α'(18,1)), - - - ,Re(α'(18,8)) | Im(α'(13,1)), - - - ,Im(α'(13,8))<br>⋮<br>Im(α'(18,1)), - - - ,Im(α'(18,8)) |
| PE4 | Re(α'(19,1)), - - - ,Re(α'(19,8))<br>Re(α'(20,1)), - - - ,Re(α'(20,8))<br>∗   ∗<br>⋮<br>∗ - - - ∗ | Im(α'(19,1)), - - - ,Im(α'(19,8))<br>Im(α'(20,1)), - - - ,Im(α'(20,8))<br>∗   ∗<br>⋮<br>∗ - - - ∗ |

Total rows: 24

MEMORY-DISTRIBUTED PARALLEL COMPUTER AND METHOD FOR FAST FOURIER TRANSFORMATION

BACKGROUND OF THE INVENTION

1. Field of the Invention

The present invention relates to a memory-distributed parallel computer system performing a fast Fourier transformation and to a Fourier transformation processing method.

2. Description of the Related Arts

Parallel computer systems are widely used to process a large-scale fast Fourier transformation (FFT) in calculating scientific technological data, etc. The FFT is a calculation algorithm in which the necessary amount of operations can be reduced when the number of terms processed in a discrete Fourier transformation can be resolved into factors. Particularly when an real large-scale Fourier transformation is performed by a vector-distributed parallel computer such as VPP500, etc., an effective method is demanded to make the most of the capabilities of the computer by collectively calculating data with a smaller amount of transfer data.

In the FFT process performed by the conventional parallel computers, data should be accessed after being distributed to a plurality of processing elements (hereinafter referred to as "PEs" or "processors" simply) each time a Fourier transformation is performed.

A Fourier transformation can be performed on real numbers by either an operation with the imaginary part of the complex Fourier transformation set to 0 or an operation with two real numbers processed as an imaginary part and a real part of a complex number. The latter has the merit of reducing the memory requirements by half the requirements for the former. The merit is attained by a conjugate pair of complex numbers contained in the result of the Fourier transformation, thereby successfully reducing the amount of data to be calculated by half.

Actually, real numbers to be transformed are arranged in columns and processed by a complex Fourier transformation in which data in an even column (or an even row) and data in an odd column (or an odd row) are processed as a real part and an imaginary part respectively. The necessary result of the real Fourier transformation can be obtained as half the amount of data provided by the conventional method. The other half can be obtained on the basis of conjugate property. However, the data in the even column (or row) and the data in the odd column (or row) are not always stored in the same processor, but the access pattern of the Fourier transformation applies to the entire processors, thereby requiring a large amount of transfer data.

Since the parallel computer normally requires a lot of overhead in transferring data, the efficiency in a vector process and a parallel process is lowered when a large amount of data is transferred.

SUMMARY OF THE INVENTION

An object of the present invention is to provide a memory-distributed parallel computer capable of, and also a method of, efficiently performing a real FFT with a smaller amount of transfer data.

The parallel computer system according to the present invention is a memory-distributed parallel computer system which distributes data to the memory in a plurality of processors and performs a fast Fourier transformation while transferring data between the processors. It comprises an input unit, an array storage unit, a first storage unit, a second storage unit, a calculating unit, a transposing unit, and an output unit.

In an aspect of the present invention, the input unit inputs real number data as a first two-dimensional array consisting of the first and second dimensions.

The array storage unit divides the first dimension of the first two-dimensional array by the number of processors, generates a plurality of subarrays whose first dimension is even, and distributes and stores the plurality of subarrays in the plural processors.

The first and second data are obtained by dividing the first dimension of each of the above described subarrays. The first storage unit stores the first data, and the second storage unit stores the second data.

The calculating unit moves the first and second data from the array storage unit to the first storage unit and second storage unit, performs in each processor the complex Fourier transformation on the second dimension with the first and second data processed as a real part and an imaginary part respectively, and obtains the first transformation result of the complex Fourier transformation. Using the first transformation result, it obtains the second transformation result of the Fourier transformation performed on the above described real number data.

The output unit outputs the second transformation result.

In another aspect of the present invention, the calculating unit calculates, from the first transformation result, a part of the third transformation result of the real Fourier transformation performed on the second dimension of the first two-dimensional array, and stores in the array storage unit the second two-dimensional array comprising the real and imaginary parts of the third transformation result. The transposing unit transposes the second two-dimensional array stored in the array storage unit to the first storage unit and second storage unit, thus storing the real and imaginary parts of the third transformation result in the first storage unit and second storage unit respectively. Then, the calculating unit performs the complex Fourier transformation in each processor on the first dimension of the second two-dimensional array using the data stored in the first storage unit and second storage unit, and obtains the second transformation result from the result of the above mentioned complex Fourier transformation.

The two-dimensional real data input by the input unit is distributed to a plurality of processors as the first two-dimensional array by the array storage unit. To perform the two-dimensional real Fourier transformation, the Fourier transformation is performed on the first dimension and second dimension of the first two-dimensional array. In the case of a matrix, the first or second dimension represents one of a row and a column. At this time, the size of the first dimension of the first two-dimensional array is set as, for example, a multiple of double the number of processors so that the first dimension of the subarray in each processor can be even when the size is divided by the number of processors. This enables each subarray to be divided into halves at the first dimension for storage. Each subarray is divided into the first and second data. The first storage unit stores the first data, and the second storage unit stores the second data.

The calculating unit performs the complex Fourier transformation in each processor with the first data in the first storage unit and the second data in the second storage unit respectively processed as a real part and an imaginary part of a complex number. Thus, the complex Fourier transformation is performed in each processor on the undivided second dimension to obtain the first transformation result. The result of the real Fourier transformation performed on the second dimension of the first and second data can be easily obtained from the first transformation result. If the complex Fourier transformation is then performed on the first dimension, the second transformation result is obtained as a result of the two-dimensional Fourier transformation performed on the above described real data.

Thus, the Fourier transformation can be performed on two sets of real data after dividing the input two-dimensional data into halves in each processor and processing one half as a real part and the other half as an imaginary part. Since the operations are performed close in each of the processors, the time required for data transmission can be saved and the processes can be performed efficiently.

In a still another aspect of the present invention, when the input data is one-dimensional real data, it is transformed into two-dimensional data and stored in the array storage unit so that it can be processed as two-dimensional data. In this case, each processor performs rotating operations before the complex Fourier transformation is performed on the first dimension.

In a further aspect of the present invention, when the Fourier transformation is performed on real data of 3 or more dimensions, the data can be processed in the same manner as the two-dimensional data.

When the second transformation result is obtained from the first transformation result, the calculating unit obtains from the first transformation result the third transformation result, that is, a result of the real Fourier transformation performed on the second dimension of the first two-dimensional array. The third transformation result normally has a specific conjugate property based on which a half of the third transformation result can be calculated from the other half. Therefore, only a part (half) of the third transformation result is required. The obtained portions of the real and imaginary parts of the third transformation result are stored in the array storage unit as the second two-dimensional array.

However, since the first dimension of the second two-dimensional array is arranged over a plurality of processors, the Fourier transformation cannot be performed on the remaining first dimension with each processor closed. Therefore, the transposing unit transposes the second two-dimensional array and stores it in the first storage unit and second storage unit. Thus, the real and imaginary parts of portions of the third transformation result are stored in the first storage unit and second storage unit. The calculating unit processes these parts as a set of complex numbers, performs in each processor the complex Fourier transformation on the first dimension of the second two-dimensional array, and finally obtains the second transformation result. The obtained second transformation result is provided as a result of the Fourier transformation performed on the input two-dimensional real data.

Transposing a two-dimensional array after performing the Fourier transformation on the second dimension enables the Fourier transformation to be performed also on the first dimension in a plurality of processors in parallel. When one-dimensional real data is processed, rotating operations are performed on the second two-dimensional array stored in the array storage unit, and the result is transposed to perform the Fourier transformation on the first dimension.

In a still further aspect of the present invention, provided is a computer-readable storage medium, which is used to direct a parallel computer to perform the above mentioned functions of the input unit, the array storage unit, the first and second storage unit, the calculating unit, the transposing unit, and the output unit. The storage medium corresponds to, for example, one of a memory, a floppy disk, a magnetic disk, an optical memory disk, and a magneto-optical disk.

BRIEF DESCRIPTION OF THE DRAWINGS

FIG. 12 shows an example of a copied two-dimensional array;

FIG. 13 shows an example of the two-dimensional array after a complex Fourier transformation;

FIG. 14 shows an example of storing a result of a real Fourier transformation;

FIG. 15 shows an example of the two-dimensional array after a rotating operation;

DESCRIPTION OF THE PREFERRED EMBODIMENTS

The preferred embodiment of the present invention is described in detail by referring to the attached drawings.

Figure 1:
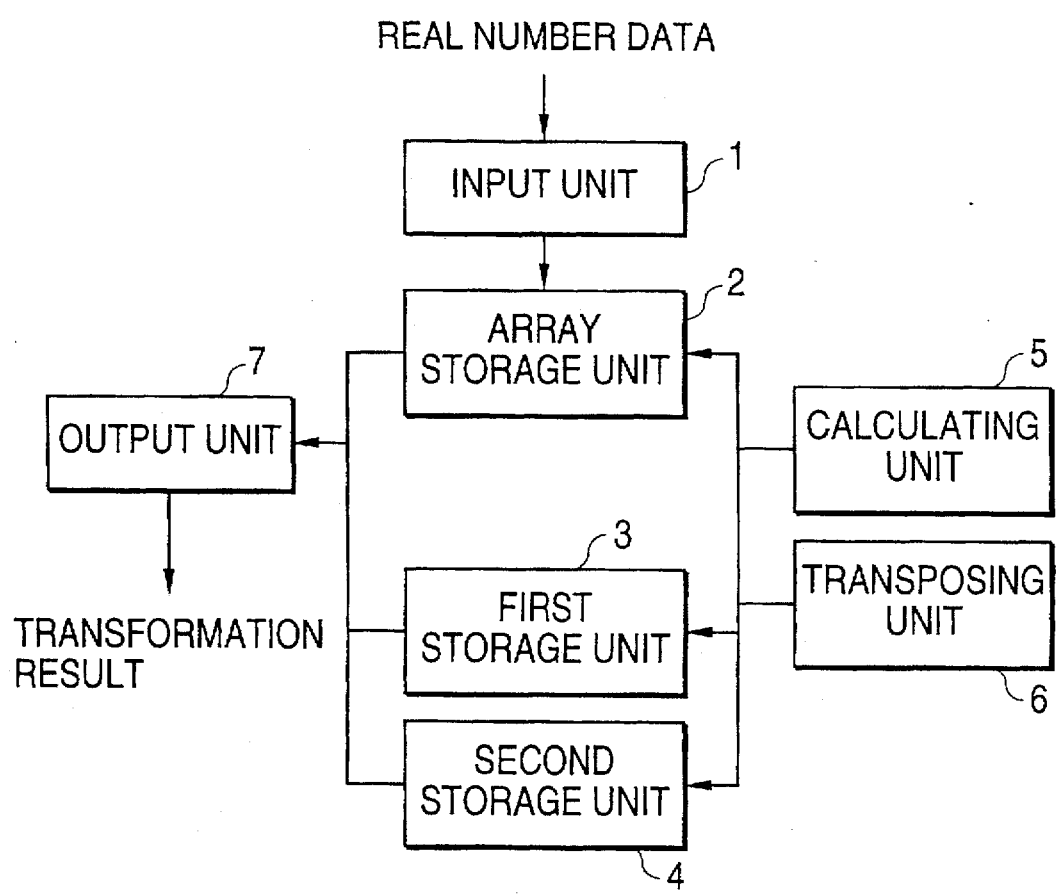
FIG. 1 shows the principle of the present invention.

FIG. 1 shows the principle of the parallel computer system according to the present invention. The parallel computer system shown in FIG. 1 is a memory-distributed parallel computer system which distributes data to the memory in a plurality of processors and performs a fast Fourier transformation while transferring data between the processors. It comprises an input unit 1, an array storage unit 2, a first storage unit 3, a second storage unit 4, a calculating unit 5, a transposing unit 6, and an output unit 7.

The input unit 1 inputs real number data as a first two-dimensional array consisting of the first and second dimensions.

The array storage unit 2 divides the first dimension of the first two-dimensional array by the number of processors, generates a plurality of subarrays whose first dimension is even, and distributes and stores the plurality of subarrays in the plural processors.

The first and second data are obtained by dividing the first dimension of each of the above described subarrays. The first storage unit 3 stores the first data, and the second storage unit 4 stores the second data.

The calculating unit 5 moves the first and second data from the array storage unit 2 to the first storage unit and second storage unit 4, performs in each processor the complex Fourier transformation on the second dimension with the first and second data processed as a real part and an imaginary part respectively, and obtains the first transformation result of the complex Fourier transformation. Using the first transformation result, it obtains the second transformation result of the Fourier transformation performed on the above described real number data.

The output unit 7 outputs the second transformation result.

The calculating unit 5 calculates, from the first transformation result, a part of the third transformation result of the real Fourier transformation performed on the second dimension of the first two-dimensional array, and stores in the array storage unit 2 the second two-dimensional array comprising the real and imaginary parts of the third transformation result. The transposing unit 6 transposes the second two-dimensional array stored in the array storage unit 2 to the first storage unit and second storage unit 4, thus storing the real and imaginary parts of the third transformation result in the first storage unit 3 and second storage unit 4 respectively. Then, the calculating unit 5 performs the complex Fourier transformation in each processor on the first dimension of the second two-dimensional array using the data stored in the first storage unit 3 and second storage unit 4, and obtains the second transformation result from the result of the above mentioned complex Fourier transformation.

For example, the input unit 1 and output unit 7 shown in FIG. 1 correspond to an input/output device 13 in FIG. 2 explained later with an embodiment of the present invention. The array storage unit 2, first storage unit 3, and second storage unit 4 correspond to memory 16 in each of processor 11-1, 11-2, ..., and 11-M in FIG. 2. The calculating unit 5 and transposing unit 6 correspond to an processing unit 15 in each of the processors 11-1, 11-2, ..., and 11-M. Furthermore, for example, the storage media such as disk devices, etc. for storing the programmed functions of each unit also correspond to each unit.

The two-dimensional real data input by the input unit is distributed to a plurality of processors as the first two-dimensional array by the array storage unit 2. To perform the two-dimensional real Fourier transformation, the Fourier transformation is performed on the first dimension and second dimension of the first two-dimensional array. In the case of a matrix, the first or second dimension represents one of a row and a column. At this time, the size of the first dimension of the first two-dimensional array is set as, for example, a multiple of double the number of processors so that the first dimension of the subarray in each processor can be even when the size is divided by the number of processors. This enables each subarray to be divided into halves at the first dimension for storage. Each subarray is divided into the first and second data. The first storage unit 3 stores the first data, and the second storage unit 4 stores the second data.

The calculating unit 5 performs the complex Fourier transformation in each processor with the first data in the first storage unit 3 and the second data in the second storage unit 4 respectively processed as a real part and an imaginary part of a complex number. Thus, the complex Fourier transformation is performed in each processor on the undivided second dimension to obtain the first transformation result. The result of the real Fourier transformation performed on the second dimension of the first and second data can be easily obtained from the first transformation result. If the complex Fourier transformation is then performed on the first dimension, the second transformation result is obtained as a result of the two-dimensional Fourier transformation performed on the above described real data.

Thus, the Fourier transformation can be performed on two sets of real data after dividing the input two-dimensional data into halves in each processor and processing one half as a real part and the other half as an imaginary part. Since the operations are performed close in each of the processors, the time required for data transmission can be saved and the processes can be performed efficiently.

When the input data is one-dimensional real data, it is transformed into two-dimensional data and stored in the array storage unit 2 so that it can be processed as two-dimensional data. In this case, each processor performs rotating operations before the complex Fourier transformation is performed on the first dimension. When the Fourier transformation is performed on real data of 3 or more dimensions, the data can be processed in the same manner as the two-dimensional data.

When the second transformation result is obtained from the first transformation result, the calculating unit 5 obtains from the first transformation result the third transformation result, that is, a result of the real Fourier transformation performed on the second dimension of the first two-dimensional array. The third transformation result normally has a specific conjugate property based on which a half of the third transformation result can be calculated from the other half. Therefore, only a part (half) of the third transformation result is required. The obtained portions of the real and imaginary parts of the third transformation result are stored in the array storage unit 2 as the second two-dimensional array.

However, since the first dimension of the second two-dimensional array is arranged over a plurality of processors, the Fourier transformation cannot be performed on the remaining first dimension with each processor closed. Therefore, the transposing unit transposes the second two-dimensional array and stores it in the first storage unit 3 and second storage unit 4. Thus, the real and imaginary parts of portions of the third transformation result are stored in the first storage unit 3 and second storage unit 4. The calculating unit 5 processes these parts as a set of complex numbers, performs in each processor the complex Fourier transformation on the first dimension of the second two-dimensional array, and finally obtains the second transformation result. The obtained second transformation result is provided as a result of the Fourier transformation performed on the input two-dimensional real data.

Transposing a two-dimensional array after performing the Fourier transformation on the second dimension enables the Fourier transformation to be performed also on the first dimension in a plurality of processors in parallel. When one-dimensional real data is processed, rotating operations are performed on the second two-dimensional array stored in the array storage unit, and the result is transposed to perform the Fourier transformation on the first dimension.

Figure 2:
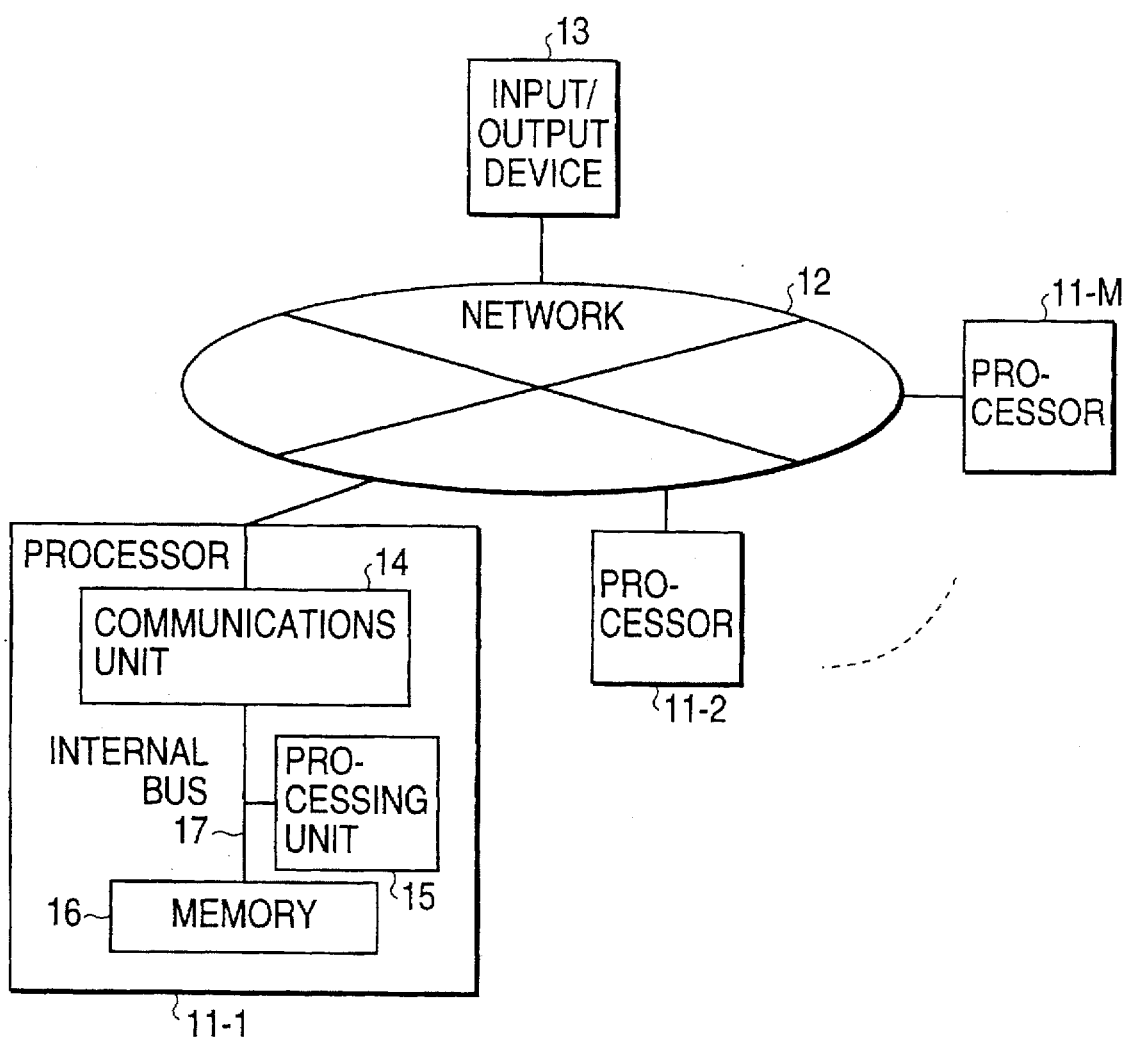
FIG. 2 shows the configuration of the parallel computer system.

FIG. 2 shows the configuration of the parallel computer system according to the embodiment. The parallel computer system shown in FIG. 2 comprises a plurality of processors 11-1, 11-2, ..., and 11-M connected through a network 12, and is provided with the input/output device 13. The network 12 is designed to transfer data between arbitrary two processors. For example, the network can be a crossbar network. The input/output device 13 can be a terminal device provided with, for example, a display and a keyboard. It receives data to be processed by a Fourier transformation and outputs a transformation result.

Each of the processors 11-1, 11-2, ..., and 11-M comprises a communications unit 14, the processing unit 15, the memory 16, and an internal bus 17 for connecting these units. The communications unit 14 transfers data between other processors and input/output device 13 through the network 12. The memory 16 stores data assigned to each processor and data transferred from other processors. The processing unit 15 performs operations using the data stored in the memory 16.

Described below according to the present embodiment are the Fourier transformations performed by the parallel computer shown in FIG. 2 on the one-, two-, and three-dimensional data. First, the mathematical conditions required for the Fourier transformation are listed below.

The one-dimensional discrete Fourier transformation is calculated by the following equation.

$$f = \sum_{n=0}^{N-1} x_n \omega_N^{nj} \tag{1}$$

where $$\omega_N = \exp(-2\pi i/N) \tag{2}$$

Assuming that N is resolved into factors p·q, the following equations can be set.

$$n = n1 + n2 \cdot p \tag{3}$$

$(n1=0, 1, \ldots, p-1, n2=0, 1, \ldots, q-1)$ $$j = j1 + j2 \cdot q \tag{4}$$

$(j1=0, 1, \ldots, q-1, j2=0, 1, \ldots, p-1)$ $$x(n1, n2) = x_n \tag{5}$$

$$f(j1, j2) = f_j \tag{6}$$

Equations (3), (4), (5), and (6) are substituted for equation (1) and the sum about n is rewritten to the sum about n1 and n2 as follows.

$$f(j1, j2) = \sum_{n1=0}^{p-1} \omega_p^{n1j2} \omega_N^{n1j1} \cdot \tag{7}$$

$$\sum_{n2=0}^{q-1} x(n1,n2) \omega_q^{n2j1}$$

If the term N in the discrete Fourier transformation can be properly factored, the one-dimensional data can be processed as if it were two-dimensional data. In the process of the parallel computer, the first dimension of, for example, $x(n1, n2)$ is divided and distributed to a plurality of processors. At this time, equation (7) is divided into the following 4-stage process.

$$Y1(n1,j1) = \sum_{n2=0}^{q-1} x(n1,n2) \omega_q^{n2j1} \tag{8}$$

$$Y2(n1,j1) = \omega_N^{n1j1} Y1(n1,j1) \tag{9}$$

$$Y3(j1,n1) = Y2(n1,j1) \tag{10}$$

$$Y4(j1,j2) = \sum_{n1=0}^{p-1} Y3(j1,n1) \omega_p^{n1j2} \tag{11}$$

Equation (8) represents the Fourier transformation on the subscript n2 in the two-dimensional array $x(n1, n2)$. Equation (9) represents the calculation (rotation) by multiplying Y1 (n1, j1) by the rotation factor $\omega_N^{n1j1}$. Equation (10) represents the transposition of the two-dimensional array Y2 (n1, j1). Equation (11) represents the Fourier transformation on the subscript n1 in Y3 (j1, n1). The transposition at the third stage is designed to constantly perform a Fourier transformation on the second dimension of the two-dimensional array. In this example, the second dimension of the two-dimensional array is not divided. Therefore, the Fourier transformation is performed independently on the second dimension in each processor.

Described below is the method of combining the real one-dimensional Fourier transformation with the complex Fourier transformation. The real data to be transformed is divided into $\{x1_n\}$ and $\{x2_n\}$ (n=0, ..., Q-1) which are processed as a real part and imaginary part of a complex number respectively. The following equation is set.

$$z_n = x1_n + i \times 2_n \tag{12}$$

Assuming that the results of the Fourier transformation performed on $z_n$, $x1_n$, and $x2_n$ are represented as $\{\alpha^z_j\}$, $\{\alpha^{X1}_j\}$, and $\{\alpha^{X2}_j\}$, the following equation is set.

$$\alpha^z_j = \sum_{n=0}^{Q-1} Z_n \omega_Q^{nj} \tag{13}$$

$$\alpha^{X1}_j = \sum_{n=0}^{Q-1} X1_n \omega_Q^{nj} \tag{14}$$

$$\alpha^{X1}_j = \sum_{n=0}^{Q-1} X2_n \omega_Q^{nj} \tag{15}$$

$\alpha^{X1}_j$ and $\alpha^{X2}_j$ in equations (14) and (15) are represented as follows using $\alpha^z_j$ in equation (13).

$$\alpha^{X1}_j = (\alpha^z_j + (\alpha^z_{Q-j})^*)/2 \tag{16}$$

$$\alpha^{X2}_j = (\alpha^z_j - (\alpha^z_{Q-j})^*)/2i \tag{17}$$

$$\alpha^{X1}_0 = Re(\alpha^z_0) \tag{18}$$

$$\alpha^{X2}_0 = Im(\alpha^z_0) \tag{19}$$

where $\alpha^*$ indicates the complex conjugate to $\alpha$ and $Re(\alpha)$ and $Im(\alpha)$ indicate the real part and imaginary part of $\alpha$ respectively. Therefore, if $\{\alpha^z_j\}$ is obtained, $\{\alpha^{X1}_j\}$ and $\{\alpha^{X2}_j\}$ can be calculated by equations (16) and (17). However, the result of the real Fourier transformation indicates the following conjugation relation, and therefore, $\alpha^{X1}_j$ and $\alpha^{X2}_j$ do not have to be obtained about all js.

$$\alpha^{X1}_{Q-j} = (\alpha^{X1}_j)^*, j=1, \ldots, Q-1 \tag{20}$$

$$\alpha^{X2}_{Q-j} = (\alpha^{X2}_j)^*, j=1, \ldots, Q-1 \tag{21}$$

Actually, the results of the real Fourier transformation should be obtained only on the first $(Q/2+1)$ $\alpha^{X1}_j$ and $\alpha^{X2}_j$. Here, Q/2 indicates an integer quotient (remainder is deleted) obtained by dividing Q by 2. Unless otherwise specified hereafter, any division in an equation will provide an integer quotient.

Figure 3:
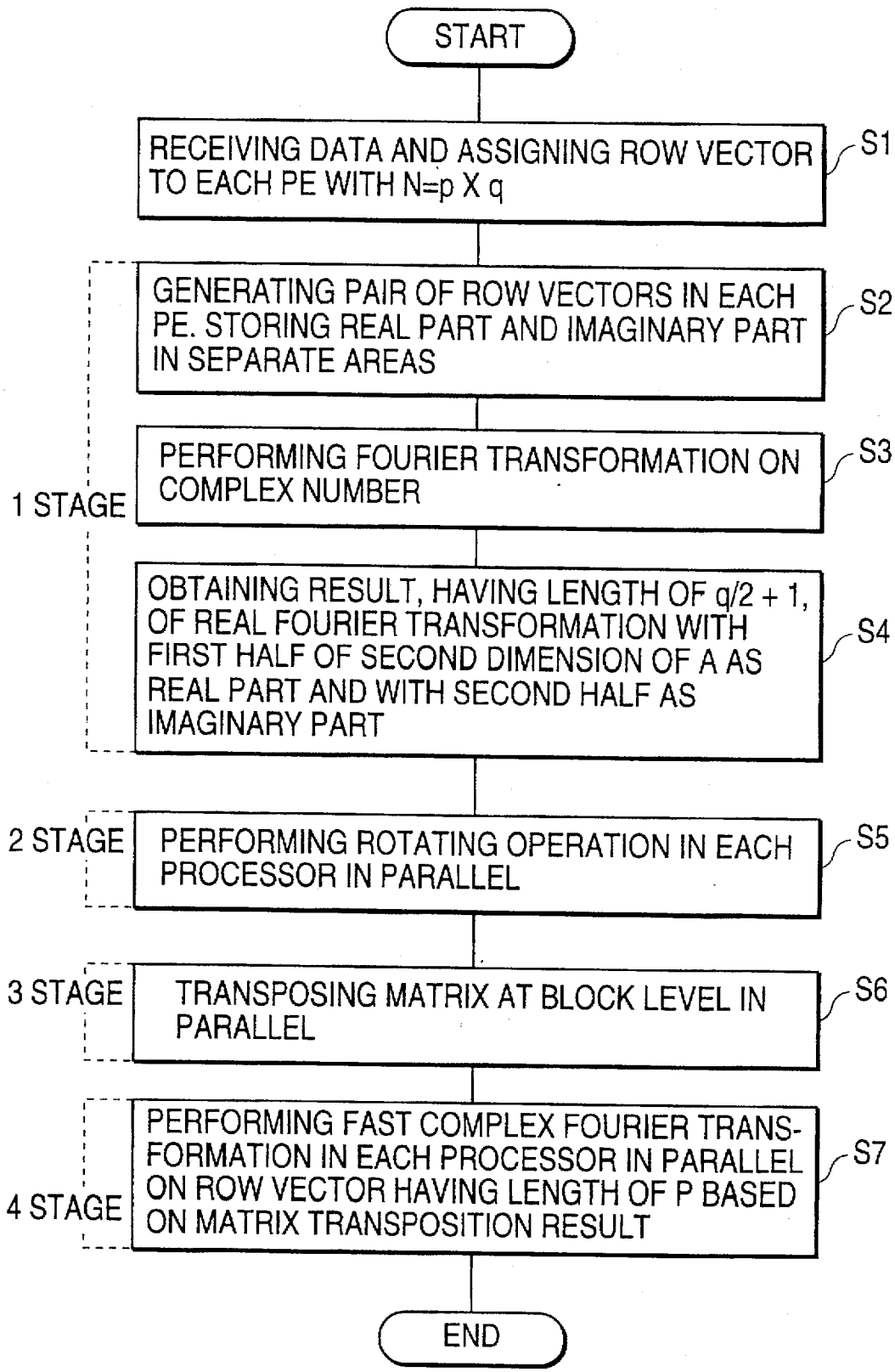
FIG. 3 is a flowchart showing the one-dimensional FFT.

Under the conditions above, the method of performing the one-dimensional real FFT is described. FIG. 3 is a flowchart of the one-dimensional real FFT for transforming N real numbers to be resolved as N=p·q by equation (1). When the process starts in FIG. 3, the input/output device 13 receives provided one-dimensional data, processes it as a two-dimensional array of N=p×q, and equally assigns a predetermined number of row vectors to each processor (PE) (step S1). The assigned row vector is stored by the memory 16 of each processor.

Figure 4:
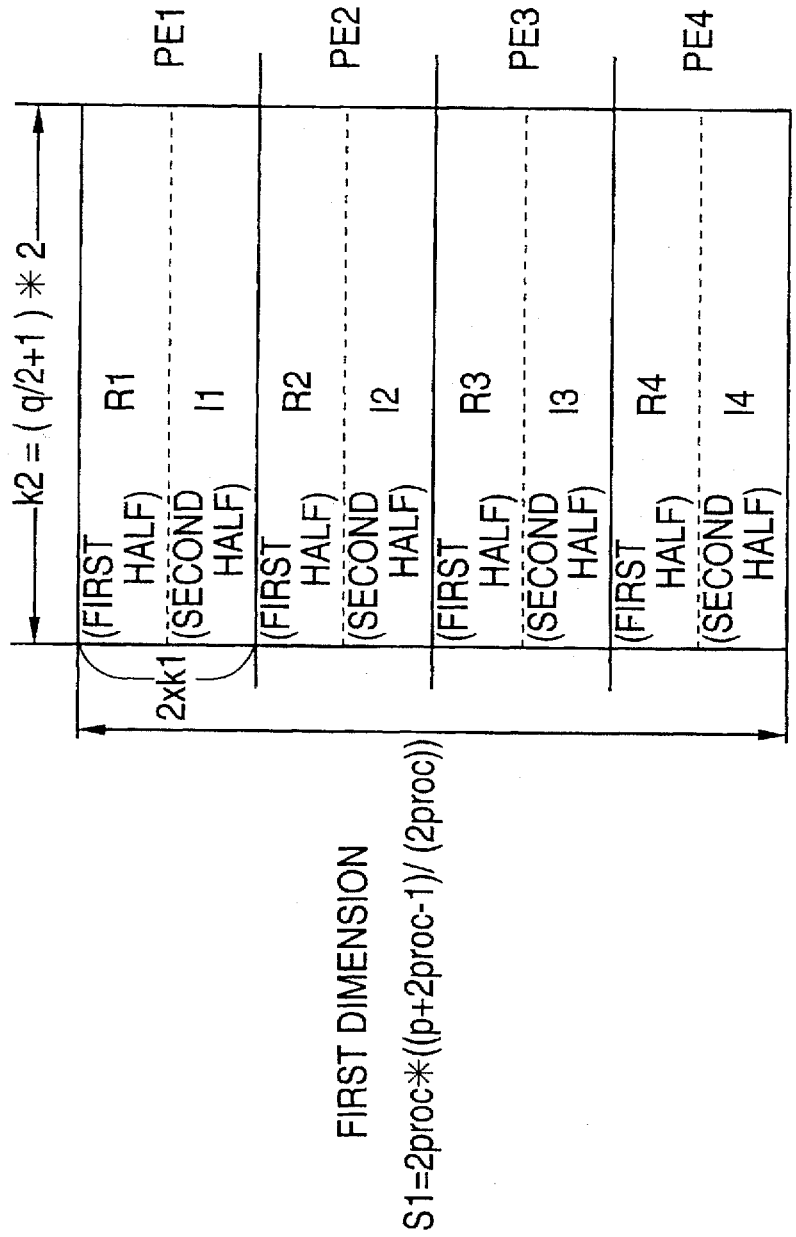
FIG. 4 shows the division of a two-dimensional array.

FIG. 4 shows the method of dividing a two-dimensional storage array A for storing two-dimensional data. In FIG. 4, the number of processors is set to 4 (PE1, PE2, PE3, and PE4) for simplification. Normally, it is written as proc. At this time, the size s1 of the first dimension of the array A (dimension of row) is calculated as follows.

$$s1 = 2 \times proc \times k1 \quad (22)$$

$$k1 = (p + 2 \times proc - 1)/(2 \times proc) \quad (23)$$

When the first dimension is equally divided by proc processors, the number of rows of the portion stored by each processor is set to an even number. The size of the second dimension of the array A is set to a value larger than the value obtained as follows.

$$k2 = (q/2+1) \times 2 \quad (24)$$

In FIG. 4, the size of the second dimension of the array A is k2, and the array A is represented as A (s1, k2). Then, the transposition storage array B (2×k3, s1) of the array A is prepared based on the following equation.

$$k3 = ((q/2 + proc)/proc) \times proc \quad (25)$$

B consists of two arrays BR (k3, s1) and BI (k3, s1) of the same size. The size k3 of the first dimension of BR and BI is obtained by amending $k2/2=(q/2+1)$ so that half the size k2 of the second dimension of the array A can be divided by the proc processors. Thus, the following equation is set.

$$2 \times k3 \geq k2 = (q/2+1) \times 2 \quad (26)$$

The first dimensions of the arrays A (s1, k2), BR (k3, s1), and BI (k3, s1) are equally divided by each processor, and the divided portions are referred to as a (2×k1, k2), br (k3/proc, s1), bi (k3/proc, s1).

Each processor performs in parallel the process at the first stage corresponding to equation (8). However, a row vector assigned to each processor is divided into a first half and a second half as a real part and an imaginary part to be processed by a complex Fourier transformation.

First, each processor generates a pair of row vectors, that is, a real part and an imaginary part, and stores them in separate areas (step S2). Practically, the storage areas br and bi are used as storage areas br (k1, 2×k3) and bi (k1, 2×k3). a (1:k1, k2) is copied to br (k1, 1:k2), and a (k1+1:2×k1, k2) is copied to bi (k1, 1:k2).

Figure 5:
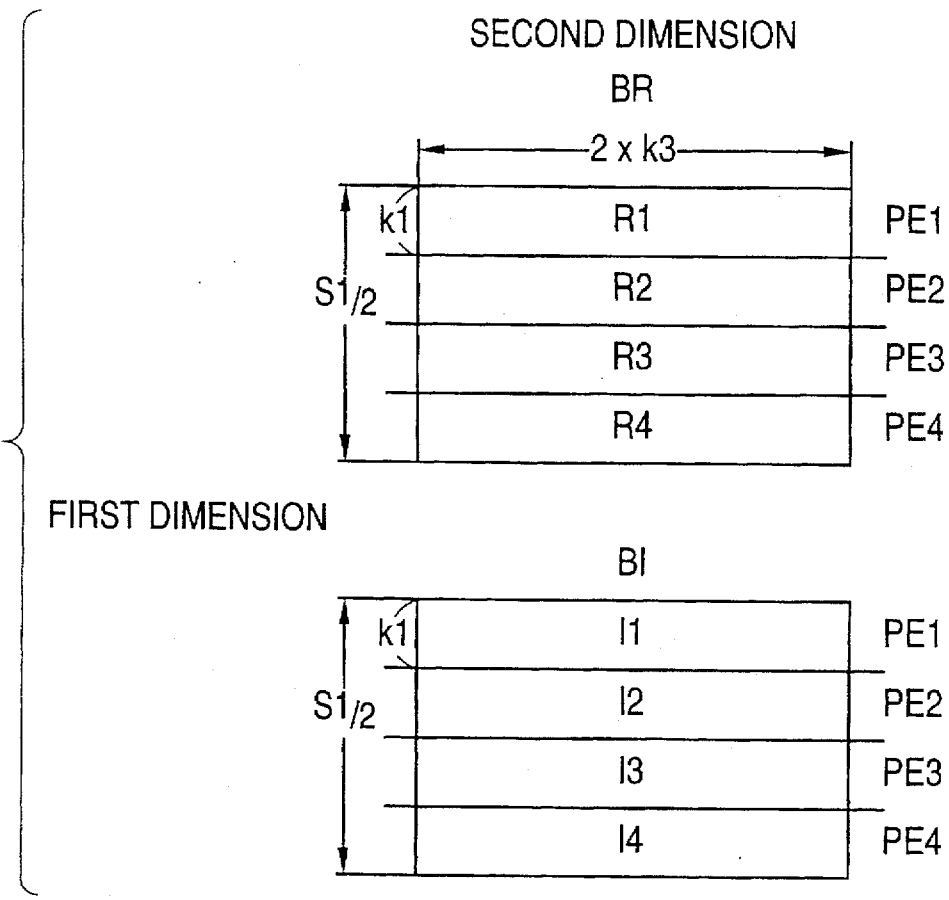
FIG. 5 shows the copy area of the two-dimensional array.

In FIG. 4, a (2×k1, k2) assigned to each of the four processors PE1, PE2, PE3, and PE4 is divided into a first half and a second half. The data in PE1 is divided into R1 and I1. The data in PE2 is divided into R2 and I2. The data in PE3 is divided into R3 and I3. The data in PE4 is divided into R4 and I4. These data are copied to the arrays BR and BI as shown in FIG. 5. In FIG. 5, R1, R2, R3, and R4 are stored in the BR as real parts, and I1, I2, I3, and I4 are stored in the BI as imaginary parts. At this time, the BR and BI are used as arrays BR (s1/2, 2×k3) and BI (s1/2, 2×k3).

Then, the row vector of br (k1, 1:k2) is combined with the row vector of the corresponding bi (k1, 1:k2) to be processed by each processor through the complex Fourier transformation (step S3). That is, the Fourier transformation is performed on the complex number $z_n$ by equation (13) (where Q=q) with each element of one row vector of br (k1, 1:k2) processed as $x1_n$ in equation (12) while each element of one row vector of bi (k1, 1:k2) processed as $x2_n$ in equation (12).

Figure 6:
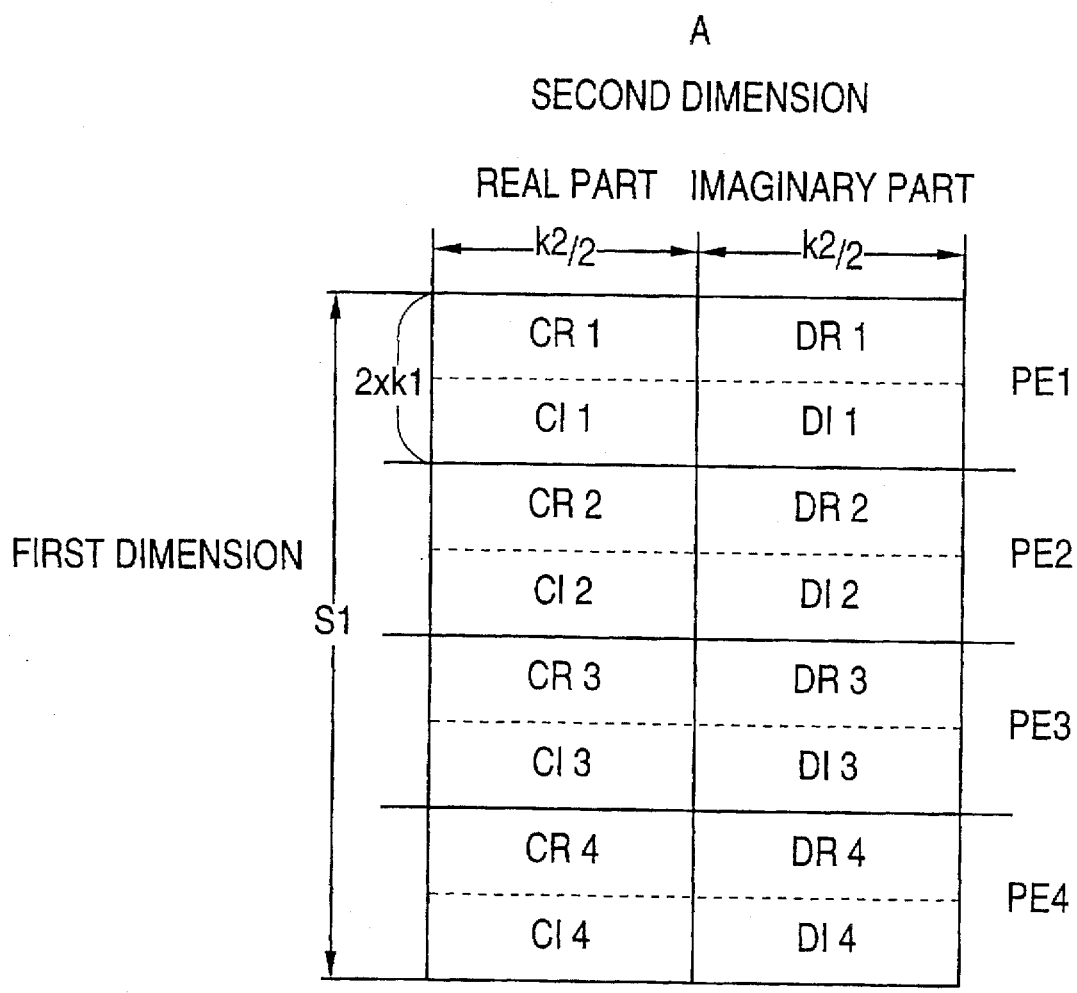
FIG. 6 shows the method of storing the result of a real Fourier transformation in the two-dimensional array.

The first (q/2+1) results of the real Fourier transformation are obtained by equations (16) through (19). The real and imaginary parts are stored in a (2×k1, 1:q/2+1) and a (2×k1, q/2+2:k2) (step S4). FIG. 6 shows the storage method. In FIG. 6, the first half of the second dimension of the array A is assigned to the real part, and the second half is assigned to the imaginary part. For example, processor PE1 obtains the first (q/2+1) results of the real Fourier transformations of row vector of the R1 shown in FIG. 4. The real parts of the results are stored in the CR1, and the imaginary parts of the results are stored in the DR1. The processor PE1 obtains the first (q/2+1) results of the real Fourier transformations of row vector of the I1 shown in FIG. 4. The real parts of the results are stored in the CI1, and the imaginary parts of the results are stored in the DI1. Similar operations are performed in areas CR2, DR2, CI2, DI2, CR3, DR3, CI3, DI3, CR4, DR4, CI4, and DI4.

According to the storage method shown in FIGS. 4 and 5, the real and imaginary parts of a complex number to be transformed are stored in the same processor. Therefore, the Fourier transformation is independently performed in each processor, data is not transferred in excess. Furthermore, performing one-dimensional Fourier transformations in a handle by the method of calculating (q/2+1) results of the real Fourier transformations from the results of the complex Fourier transformation performed with a pair of real data having the length q processed as a real part and an imaginary part, thus deriving the vector performance of the processor.

Then, each processor performs in parallel the process corresponding to equation (9) at the second stage to calculating rotation (step S5). The calculation result is stored in the array A again.

Next, the process at the third stage corresponding to equation (10) is performed. The data p×(q/2+1)×2 in the array A is divided into blocks (small areas), transposed at block levels, and stored in the array B (step S6). At this time, the storage areas BR and BI are used as the arrays BR (k3, s1) and BI (k3, s1) and are divided about the first dimension. The data transfer between the processors transposes the data of A (p, 1:q/2+1) to the data of BR (1:q/2+1, p) and transposes the data of A (p, q/2+2:(q/2+1)×2) to the data of BI (1:q/2+1, p).

Figure 7:
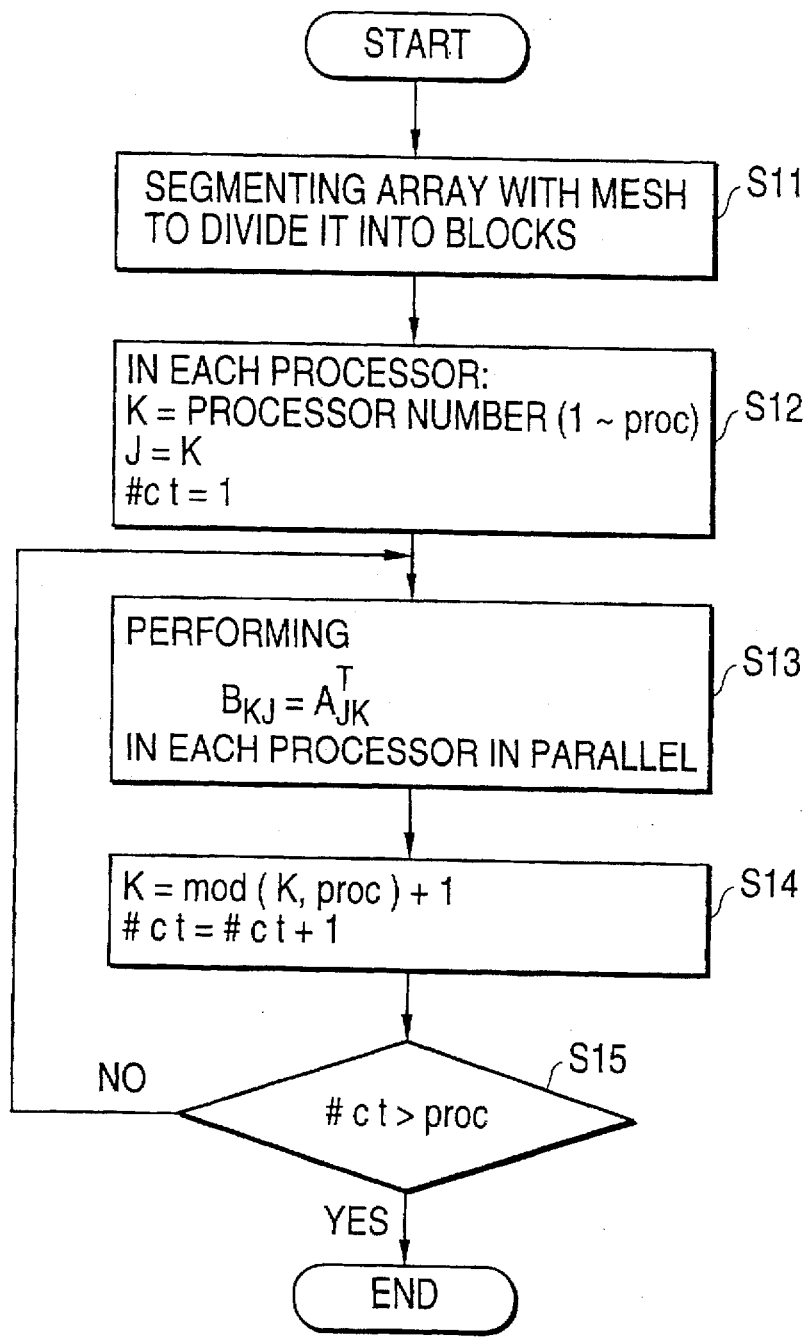
FIG. 7 is a flowchart showing the transposition of a matrix.

FIG. 7 is a flowchart showing the transposing process in a matrix in step S6. The process of transposing the real part of the array A to the array BR is described by referring to FIG. 7.

Figure 8:
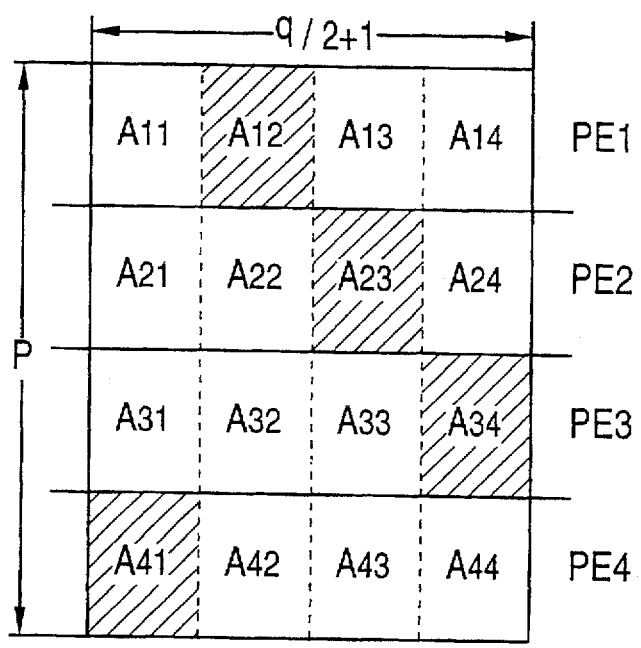
FIG. 8 shows the two-dimensional array before the transposition.
Figure 9:
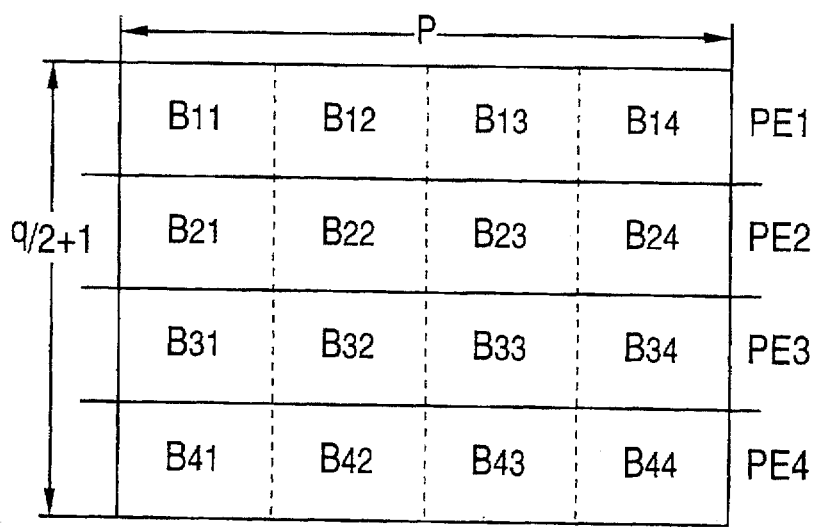
FIG. 9 shows the two-dimensional array after the transposition.

When the process is started in FIG. 7, the real part of the array A and the array BR are segmented by a mesh (step S11). As a result, the real part of the array A and the BR part in each processor are divided into blocks of the number proc of processors. FIG. 8 shows an example of dividing the real part (or imaginary part) of the array A prior to the transposition. FIG. 9 shows an example of dividing the array BR (or BI) for storing data after the transposition.

In the real part of the array A shown in FIG. 8, the data in the processor PE1 is divided into four blocks $A_{11}$, $A_{12}$, $A_{13}$, and $A_{14}$. Similarly, the data in the processor PE2 is divided into four blocks $A_{21}$, $A_{22}$, $A_{23}$, and $A_{24}$. The data in the processor PE3 is divided into four blocks $A_{31}$, $A_{32}$, $A_{33}$, and $A_{34}$. The data in the processor PE4 is divided into four blocks $A_{41}$, $A_{42}$, $A_{43}$, and $A_{44}$. In the BR shown in FIG. 9, the data in the processor PE1 is divided into four blocks $B_{11}$, $B_{12}$, $B_{13}$, and $B_{14}$. Similarly, the data in the processor PE2 is divided into four blocks $B_{21}$, $B_{22}$, $B_{23}$, and $B_{24}$. The data in the processor PE3 is divided into four blocks $B_{31}$, $B_{32}$, $B_{33}$, and $B_{34}$. The data in the processor PE4 is divided into four blocks $B_{41}$, $B_{42}$, $B_{43}$, and $B_{44}$.

Next, with K=processor number, J=K, and #ct=1 in each processor (step S12), the transposed matrix $A_{JK}^T$ of block $A_{JK}$ is obtained and stored in block $B_{KJ}$ (step S13). If the $B_{KJ}$ is in the same processor, the $A_{JK}^T$ is stored there. If the $B_{KJ}$ is in another processor, the data is transferred. Then, with K=mod (K,·proc)+1 and #ct=#ct+1 (step S14), #ct is compared with proc (step S15). "mod (K, proc)" refers to a remainder obtained when K is divided by proc. Unless #ct exceeds proc, the processes in and after step S13 are repeatedly performed. If #ct exceeds proc, the process terminates.

Figure 10:
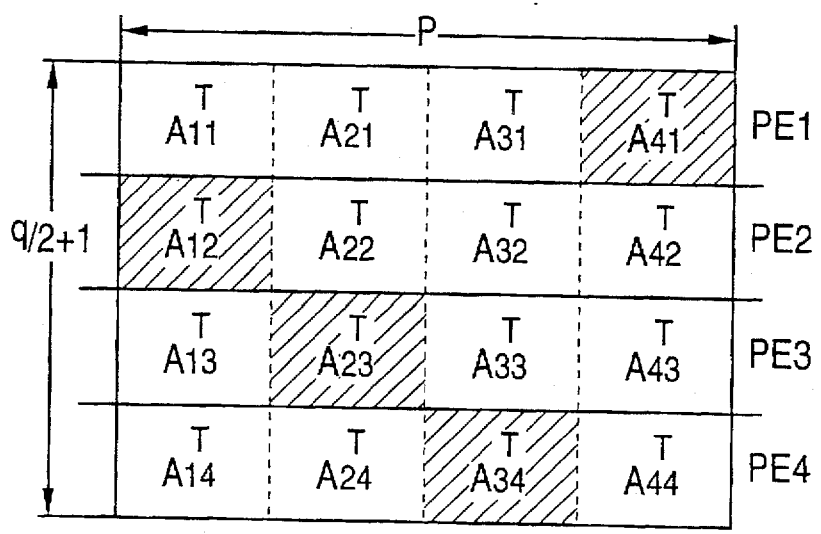
FIG. 10 shows the contents of the two-dimensional array after the transposition.

For example, the data in the processor PE1 is stored in $B_{11}$ in the processor PE1 after obtaining $A_{11}^T$ (step S13). Then, with K=mod (1, 4)+1=2 (step S14), $A_{12}^T$ is obtained (step S13). Since the corresponding storage destination $B_{21}$ is in the processor PE2, $A_{12}^T$ is transferred to the processor PE2. Similarly, $A_{13}^T$ and $A_{14}^T$ are obtained sequentially, and transferred to $B_{31}$ in the processor PE3 and $B_{41}$ in the processor PE4 respectively. When all processors complete their processes, the contents of the BR are arranged as shown in FIG. 10. In FIG. 10, $A_{11}^T$, $A_{21}^T$, $A_{31}^T$, and $A_{41}^T$ are stored in the processor PE1. $A_{12}^T$, $A_{22}^T$, $A_{32}^T$, and $A_{42}^T$ are stored in the processor PE2. $A_{13}^T$, $A_{23}^T$, $A_{33}^T$, and $A_{43}^T$ are stored in the processor PE3. $A_{14}^T$, $A_{24}^T$, $A_{34}^T$, and $A_{44}^T$ are stored in the processor PE4.

In step S13, data is transferred among proc processors, and a parallel computer such as VPP500 in which data can be simultaneously written and read to and from processors can transfer data in parallel for block elements arranged in the diagonal direction of the array. For example, the data $A_{12}^T$, $A_{23}^T$, $A_{34}^T$, and $A_{41}^T$ transposed from blocks $A_{12}$, $A_{23}$, $A_{34}$, and $A_{41}$ shown as the shadowed portions in FIG. 8 are transferred to the shadowed blocks shown in FIG. 9. Thus transposing data reduces data transfer cost.

The similar process is performed when the imaginary part of the array A is transposed to the array BI. At this time, the imaginary part of the array A is divided as shown in FIG. 8, and BI is divided as shown in FIG. 9. Transposing the array A replaces the Fourier transformation performed on the column vector of the array A with the Fourier transformation performed on the row vector of the array B. The next process at the fourth stage can be performed in parallel in each processor.

The process at the fourth step corresponding to equation (11) is performed in parallel in each processor (step S7). Then, the process terminates. In step S7, each processor performs the complex FFT on each row vector of p in length in the memory 16. Thus, p×(q/2+1) results of given N=p×q real Fourier transformations can be obtained. Since the remaining p×(q−(q/1+1)) values of the Fourier transformations are in conjugation relation with the obtained values, it is taken that all results have been obtained.

A practical example of the one-dimensional real FFT is explained below by referring to FIGS. 11 through 16.

Figure 11:
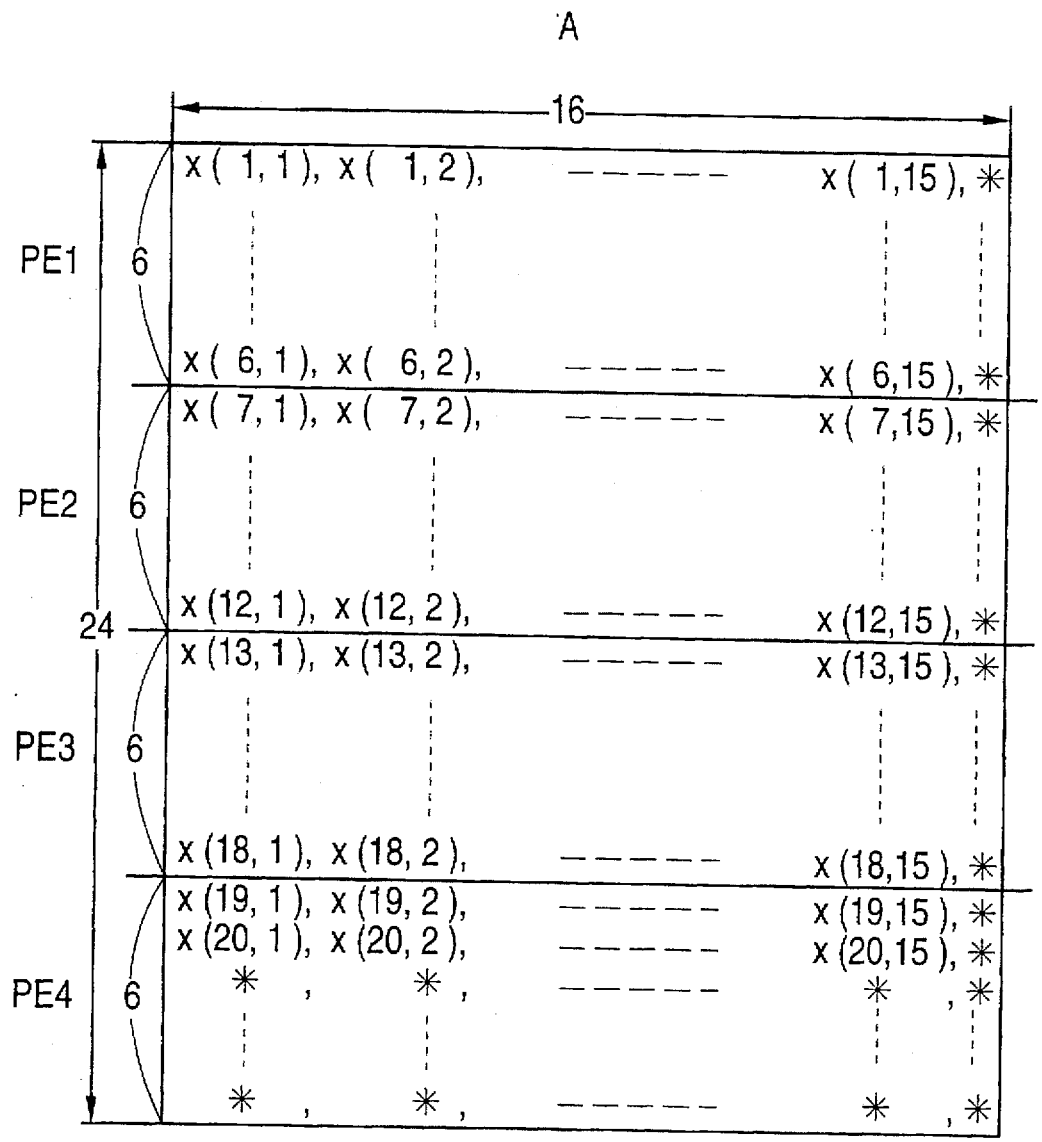
FIG. 11 shows an example of the two-dimensional array.

FIG. 11 shows an example of distributing input data to four processors after accommodating the input data in a two-dimensional storage array. In FIG. 11, N=300 real values are input as one-dimensional data, and then distributed as 20×15 two-dimensional data ×(n1, n2) (n1=1, 2, . . , 20, and n2=1, 2, . . . , 15) with p=20 and q=15 (step S1). At this time, with s1=24, k1=3, k2=16, and k3=8 through equations (22), (23), (24), and (25), the size of the array A storing 20×15 data is s1×k2=24×16. Since the first dimension of the array A is divided for four processors, the size of the storage array assigned to one processor is 6×16, and the number (6) of the row vectors is even. In this example, data are stored in all row vectors of processors PE1, PE2, and PE3 and two row vectors of processor PE4. The value of an element (marked with * in FIG. 11) which does not store the data of the array A is set to 0 to prevent unnecessary overflow or underflow.

Thus, the data stored in the array A is copied in another storage array B in each processor (step S2). FIG. 12 shows the array B to which the data in FIG. 11 is copied. In this example, the array B is used as the array of s1×(2×k3)=24×16 and is divided into the arrays BR and BI each having the size of 12×16. In each of the arrays, the portion of 3×16 is positioned in each processor. In six row vectors of the array A assigned to each processor, the upper three row vectors are copied to the corresponding area in the BR while the lower three row vectors are copied to the corresponding area in the BI.

Next, a complex number is generated in each processor and processed in a Fourier transformation with the data stored in the BR regarded as a real part and the data stored in the corresponding position in the BI regarded as an imaginary part (step S3). For example, values are substituted in the row vector of the first row in the processor PE1 using $x1_0=x(1,1)$, $x1_1=x(1,2), \ldots, x1_{14}=x(1,15)$, and $x2_0=x(4,1)$, $x2_1=x(4,2), \ldots, x2_{14}=x(4,15)$, thereby generating 15 complex numbers $z_n$. Then, the Fourier transformation is performed on the numbers using Q=15 by equation (13). The real part of the resultant complex number $\alpha^z_j$ (j=0, 1, 2, . . , 14) is stored in the BR, and the imaginary part is stored in the BI. Other row vectors are processed similarly.

FIG. 13 shows the arrays BR and BI storing the results of the Fourier transformations. In FIG. 13, X (n1, n2) (n1=1, 2, 3, 7, 8, 9, 13, 14, 15, 19, 20, n2=1, . . . , 15) in BR represents the real part of the result of each Fourier transformation. X (n1, n2) (n1=4, 5, 6, 10, 11, 12, 16, 17, 18, n2=1, . . . , 15) in BI represents the imaginary part of the result of each Fourier transformation. For example, the real part and the imaginary part of the complex number obtained as a result of the transformation from the real part x (1, n2) and the imaginary part x (4, n2) shown in FIG. 12 are X (1, n2) and X (4, n2) respectively.

Using the result of the complex Fourier transformation stored in the BR and BI, the results $\alpha^{x1}_j$ and $\alpha^{x2}_j$ of the real Fourier transformation are obtained by equations (16) through (19) and stored in the array A (step S4). Using the conjugation relation in equations (20) and (21), only $\alpha^{x1}_j$ and $\alpha^{x2}_j$ have to be obtained on the first 15/2+1=8 values of j. The result of the Fourier transformation on n2 of the obtained x (n1, n2) is written as α (n1, j2) (n1=1, . . . , 20, j2=1, . . . , 8). For example, the half of the results of the Fourier transformations on x (1, 1), x (1, 2), . . . , x (1, 15), that is, α (1, 1), α (1, 2), . . . , α (1, 8) are obtained. Similarly, the half of the results of the Fourier transformations on x (4, 1), x (4, 2), . . . , x (4, 15), that is, α (4, 1), α (4, 2), . . . , α (4, 8) are obtained. The results of the real Fourier transformations are stored in the array A as shown in FIG.

14. In FIG. 14, the real part Re ($\alpha$(n1, j2)) of $\alpha$ (n1, j2) is stored in the left half of the array A while the imaginary part Im ($\alpha$ (n1, j2)) is stored in the right half of the array A.

In each processor, $\alpha$ (n1, j2) is multiplied by a rotation factor according to equation (9), and the result $\alpha'$ (n1, j2) is stored again in the array A (step S5). FIG. 15 shows the array A storing $\alpha'$ (n1, j2). In FIG. 15, as in the case shown in FIG. 14, the real part Re ($\alpha'$ (n1, j2)) of $\alpha'$ (n1, j2) is stored in the left half of the array A while the imaginary part Im ($\alpha'$ (n1, j2)) is stored in the right half of the array A.

Figure 16:
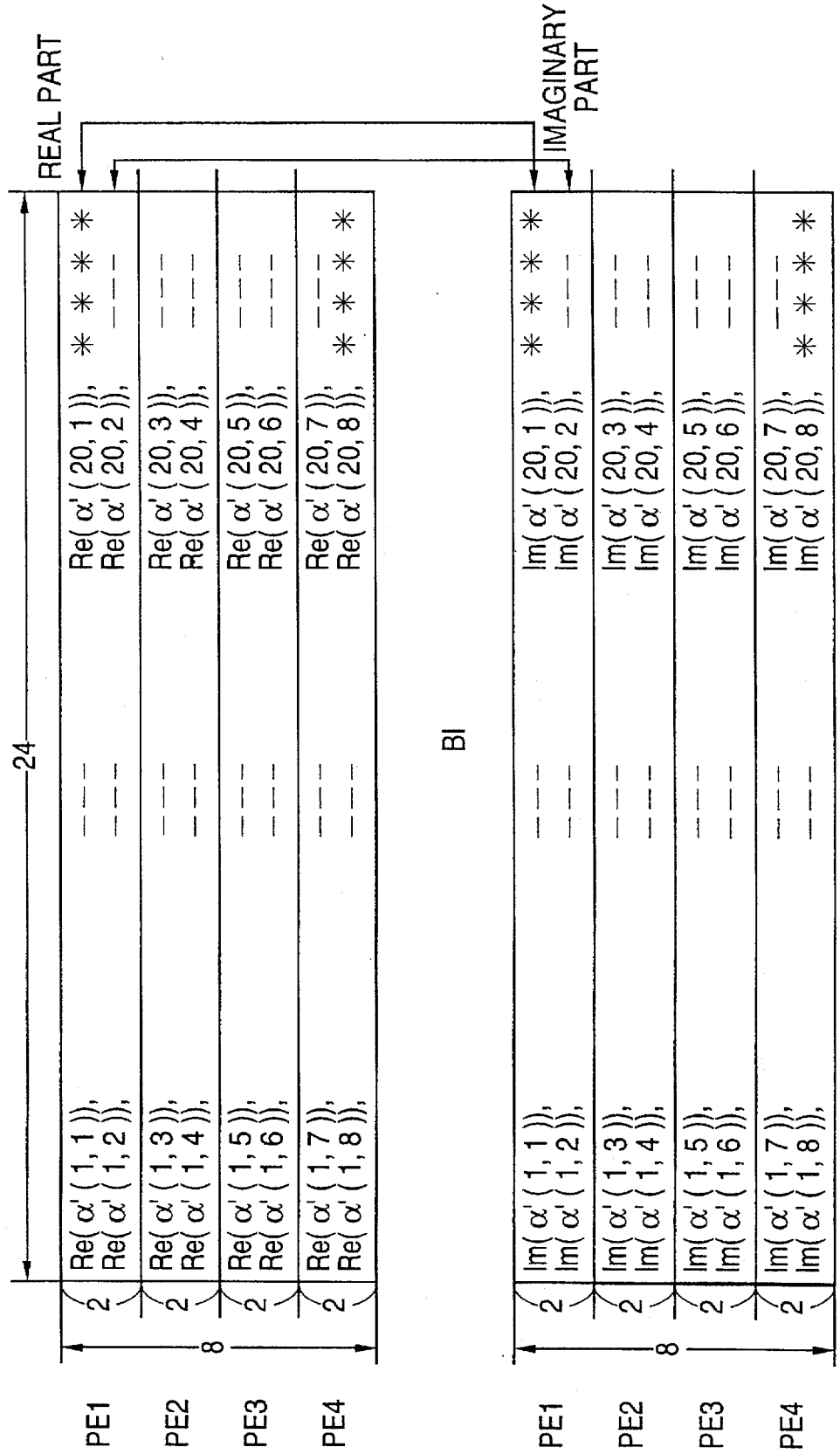
FIG. 16 shows the two-dimensional array after the transposition.

The processors PE1 through PE4 transpose the array A at the block level in the process shown in FIG. 7 and store the results in the arrays BR and BI (step S6). At this time, the left half and right half of the array A are divided as shown in FIG. 8 and the four blocks arranged in the diagonal direction are transposed and transferred in parallel. Repeating the parallel transfer transposes the entire matrix. FIG. 16 shows the arrays BR and BI which store the transposed data. The BR and BI are used individually as 8×24 arrays. Each processor stores each of the 2×24 portions of the BR and BI. For example, in the row vector Re ($\alpha'$ (1, 1)), ..., Re ($\alpha'$ (1, 8)), Im ($\alpha'$ (1, 1)), ..., Im ($\alpha'$ (1, 8)) in the first row of the processor PE1 shown in FIG. 15, Re ($\alpha'$ (1, 1)), ..., Re ($\alpha'$ (1, 8)) are stored in the first column of the BR while Im ($\alpha'$ (1, 1)), ..., Im ($\alpha'$ (1, 8)) are stored in the first column of the BI.

Next, using the transposed row vector in each processor, a Fourier transformation is performed on n1 of $\alpha'$ (n1, j2) (n1=1, ..., 20) (step S7). The calculation method is the same as that in step S3. The real and imaginary parts of $\alpha'$ (n1, j2) required in the calculation are stored separately as a real part and an imaginary part at the corresponding positions in the BR and BI. Thus, in the results of the one-dimensional real FFTs performed on the 20×15 real numbers in FIG. 11, the first half results are obtained. The remaining half are obtained as the complex conjugation of the obtained results.

Described below is the method of performing the two-dimensional real FFT. The discrete Fourier transformation of the two-dimensional data of p×q is given by the following equation.

$$f_{j1,j2} = \sum_{n2=0}^{q-1} \sum_{n1=0}^{p-1} \omega_q^{n2j2} \omega_p^{n1j1} x_{n1,n2} \qquad (27)$$

When equation (27) is compared with equation (7), the calculating procedures in the right hand side are the same except the multiplication by the rotation factor. $x_{n1,n2}$ corresponds to x (n1, n2) in equation (7), and $f_{j1,j2}$ corresponds to f (j2, j1). Therefore, the process shown in FIG. 3 is performed excluding the process at the third stage and the obtained result is transposed to perform the calculation by equation (27) through the parallel computer.

Figure 17:
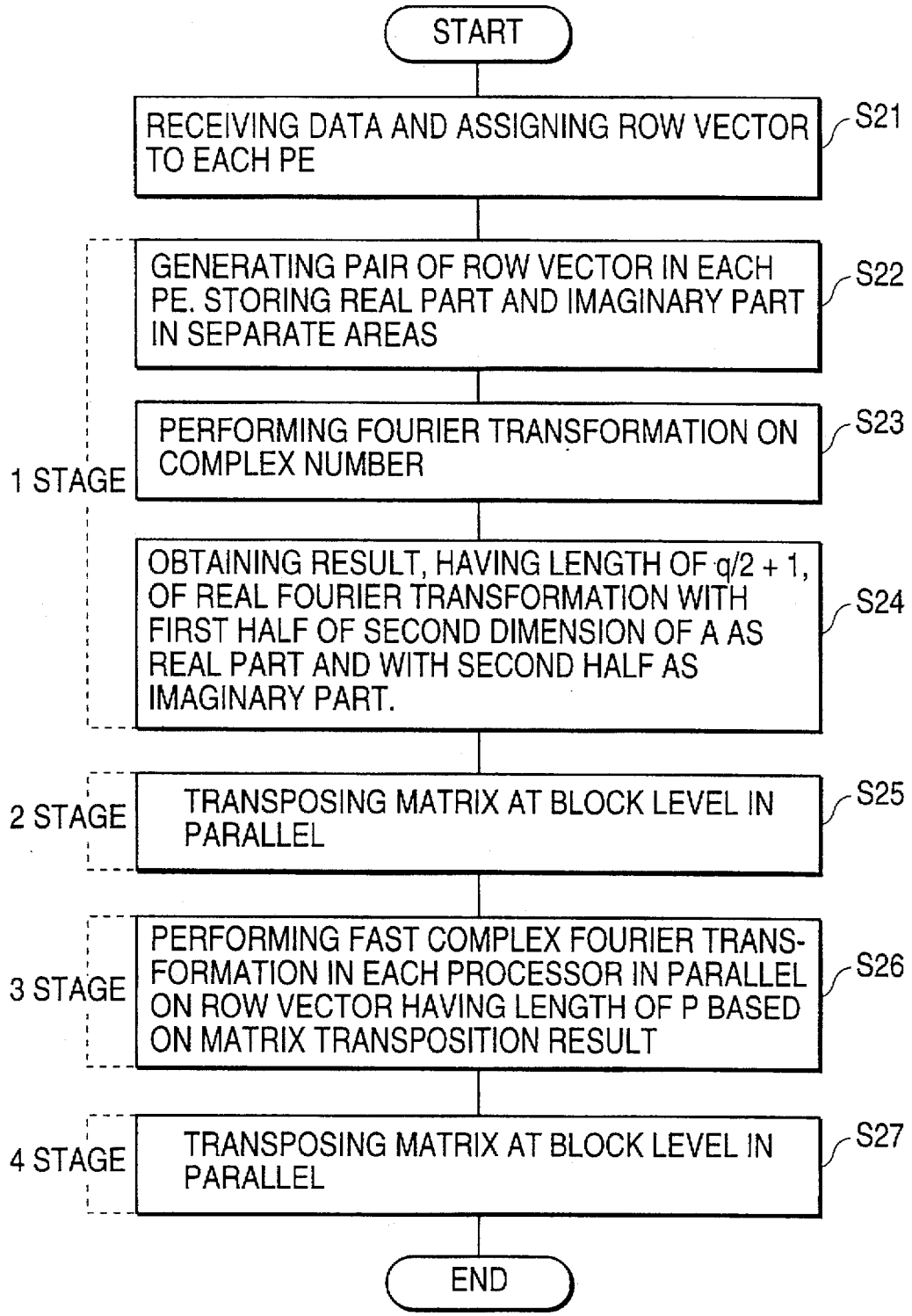
FIG. 17 is a flowchart showing the two-dimensional real FFT.

FIG. 17 is a flowchart of the two-dimensional real FFT for transforming p×q two-dimensional data by equation (27). When the process in FIG. 17 is started, the input/output device 13 receives p×q two-dimensional data, arranges it in a p×q two-dimensional array, and assigns a predetermined number of row vectors equally to each processor (step S21). The assigned row vector is stored in the memory 16 of each processor as shown in FIG. 4.

Then, as in the case of the one-dimensional real FFT, the process at the first stage corresponding to equation (8) is performed in parallel in each processor. First, each processor makes a pair of row vectors. One is copied to the storage area BR and the other is copied to the storage area BI as a real part and an imaginary part respectively as shown in FIG. 5 (step S22). Then, each processor combines the row vector of the BR with the corresponding row vector of the BI, and performs a Fourier transformation on a complex number by equation (13) (step S23). Then, the first (q/2+1) Fourier transformation results are obtained by equations (16) through (19). The real parts and imaginary parts are stored in the array A as shown in FIG. 6 (step S24).

Next, the process at the second stage is performed. The data of p×(q/2+1)×2 of the array A is divided into blocks (small areas) and stored in the array B after being transposed at block levels (step S25). The transposing method is shown in FIGS. 7 through 10.

Then, the process at the third level is performed in parallel in each processor, and a complex FFT is performed on each row vector having the length of p obtained as a result of the matrix transposition (step S26). The real and imaginary parts of the resultant complex number are stored in the BR (1:q/2+1, p) and the BI(1:q/2+1, p) respectively.

Then, the arrays stored in the BR and BI are transposed again at block levels and stored in the array A (step S27), thereby terminating the process. At this time, the data is transferred as in step S25, and the data in BR (1: q/2+1, p) is transposed to A (p, 1: q/2+1). The data in BI (1: q/2+1, p) is transposed to A (p, q/2+2: (q/2+1)×2).

Of the results of the Fourier transformations performed on p×q real numbers, p×(q/2+1) results are obtained. Since the results of the two-dimensional real Fourier transformation and the one-dimensional real Fourier transformation have the similar conjugate properties, the remaining p×(q-(q/2+1)) results can be obtained from the calculated results.

Described below is the method of the three-dimensional real FFT as an extension of the two-dimensional real FFT. The discrete Fourier transformation on the three-dimensional data of p×q×r can be calculated by the following equation.

$$f_{j1,j2,j3} = \sum_{n3=0}^{r-1} \sum_{n2=0}^{q-1} \sum_{n1=0}^{p-1} \omega_r^{n3j3} \omega_q^{n2j2} \omega_p^{n1j1} x_{n1,n2,n3} \qquad (28)$$

Since equation (28) is a three-dimensional extension of equation (27), the three-dimensional real FFT is performed basically in the same method as the two-dimensional real FFT. However, a Fourier transformation should be additionally performed on the third dimension.

Figure 18:
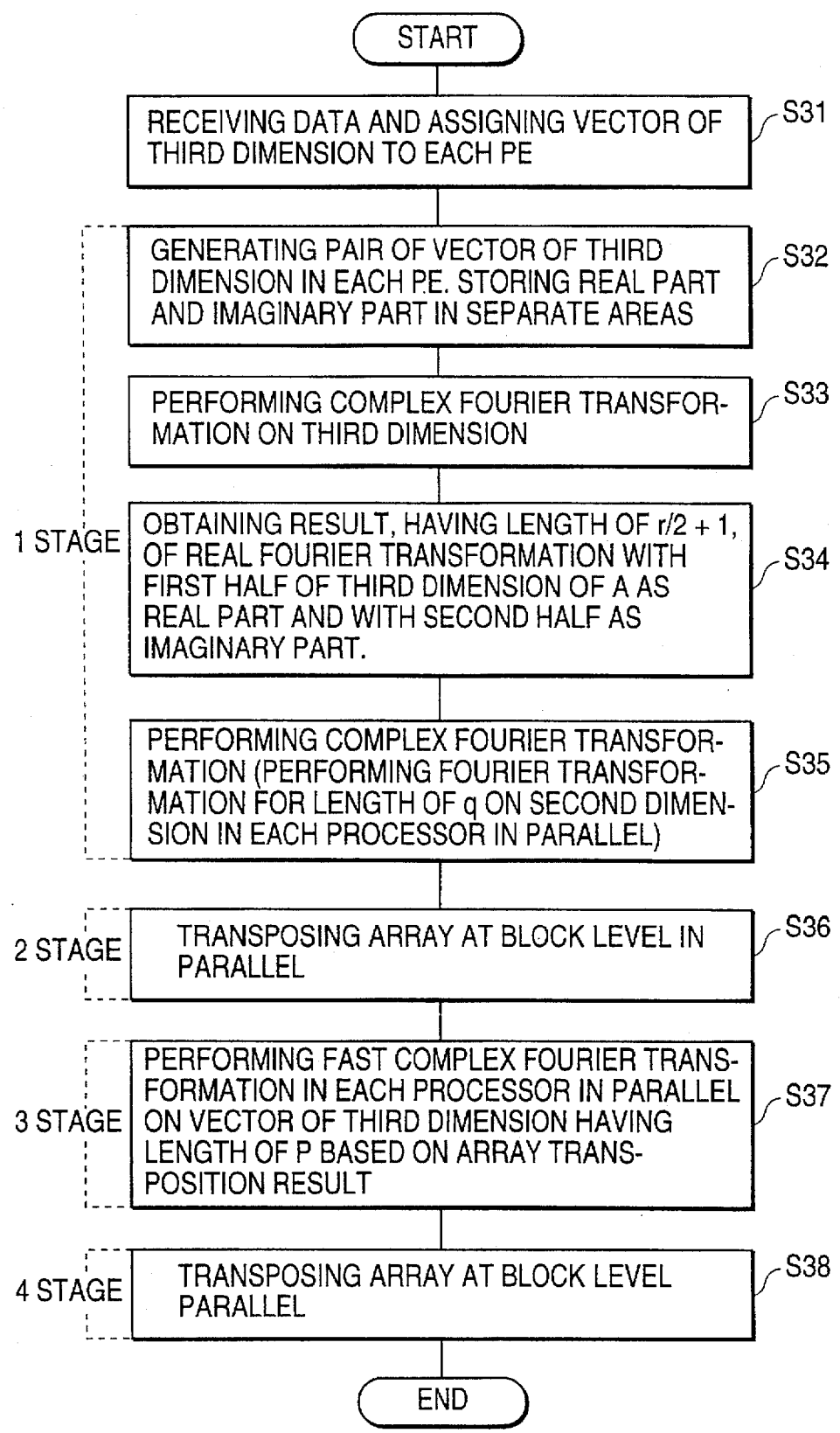
FIG. 18 is a flowchart showing the three-dimensional real FFT.

FIG. 18 is a flowchart showing the three-dimensional real FFT through which p×q×r three-dimensional data are transformed by equation (28). If the process shown in FIG. is started, the input/output device 13 first receives three-dimensional data and arrange it in a p×q×r three-dimensional array. Then, it divides the three-dimensional array in the first dimension and equally assigns a predetermined number of the vectors in the third dimension to each processor (step S31). The assigned vector of the third dimension is stored in the memory 16 of each processor.

Figure 19:
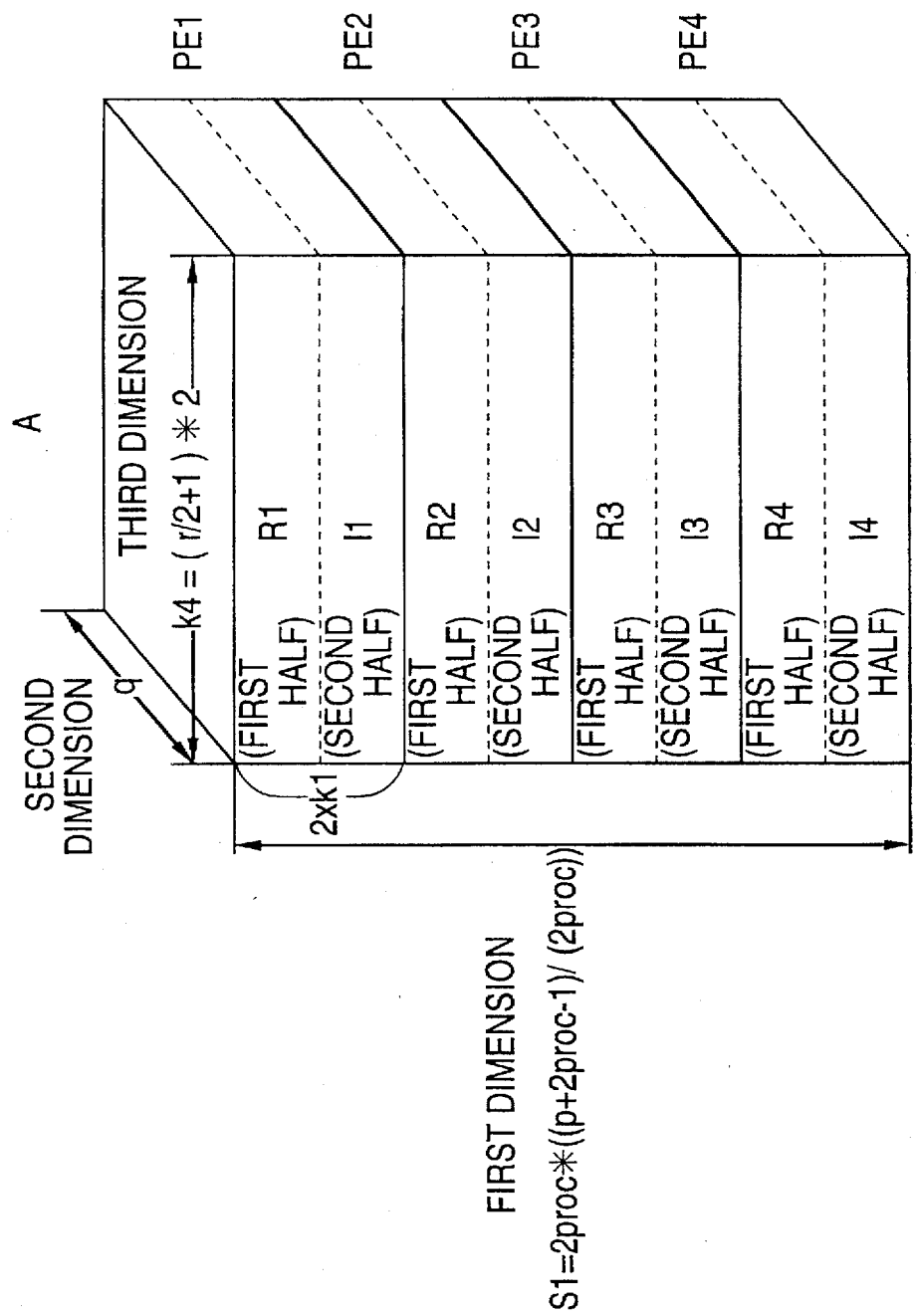
FIG. 19 shows the division of a three-dimensional array.

FIG. 19 shows the method of dividing the three-dimensional storage array A for storing three-dimensional data. In FIG. 19, the number of processors is four (PE1, PE2, PE3, and PE4) for simplification. They are hereinafter referred to as proc in general. At this time, the size s1 of the first dimension (row dimension) of the array A is defined as follows as in equations (22) and (23), $$s1 = 2 \times proc \times k1 \qquad (29)$$

$$k1 = (p + 2 \times proc - 1)/(2 \times proc) \qquad (30)$$

and the number of rows stored in each processor is even when the first dimension is equally divided by proc processors. The size of the second dimension of the array A is q, and the size of the three-dimension is equal to or more than the following value.

$$k4=(r/2+1)\times \quad (31)$$

In FIG. 19, the size of the third dimension of the array A is k4, and the array A is represented as A (s1, q, k4). Next, equation (32) is set as follows.

$$k5=((r/2+\text{proc})/\text{proc})\times \text{proc} \quad (32)$$

The transposition storage array B (2×k5, q, s1) for the first and third dimensions is prepared. The array B consists of two arrays BR (k5, q, s1) and BI (k5, q, s1) of the same size. The size k5 of the first dimension of the arrays BR and BI is determined through correction from k4/2=(r/2+1) such that half the size k4 of the third dimension of the array A can be divided by proc processors. Therefore, $$2\times k5 \geq k4 = (q/2+1)\times 2 \quad (33)$$

Then, the first dimensions of the arrays A (s1, q, k4), BR (k5, q, s1), and BI (k5, q, s1) are equally divided by each processor and the portions assigned to each processor are a (2×k1, q, k4), br (k5/proc, q, s1), and bi (k5/proc, q, s1) respectively.

Next, in each processor, the process at the first stage is performed in parallel. To reduce the area used in memory, the vector of the third dimension assigned to each processor is divided into two portions, that is, the first half and the second half named a real part and an imaginary part respectively. Then, the complex Fourier transformations are performed on these real and imaginary parts.

First, each processor generates a pair of vectors of the three dimensions. One is stored as a real part and the other is stored as an imaginary part in separate areas (step S32). Practically, the storage areas br and bi are used as the storage areas br (k1, q, 2×k5) and bi (k1, q, 2×k5). a (1: k1, q, k4) is copied to br (k1, q, 1: k4), and a (k1+1:2×k1, q, k4) is copied to bi (k1, q, 1: k4).

Figure 20:
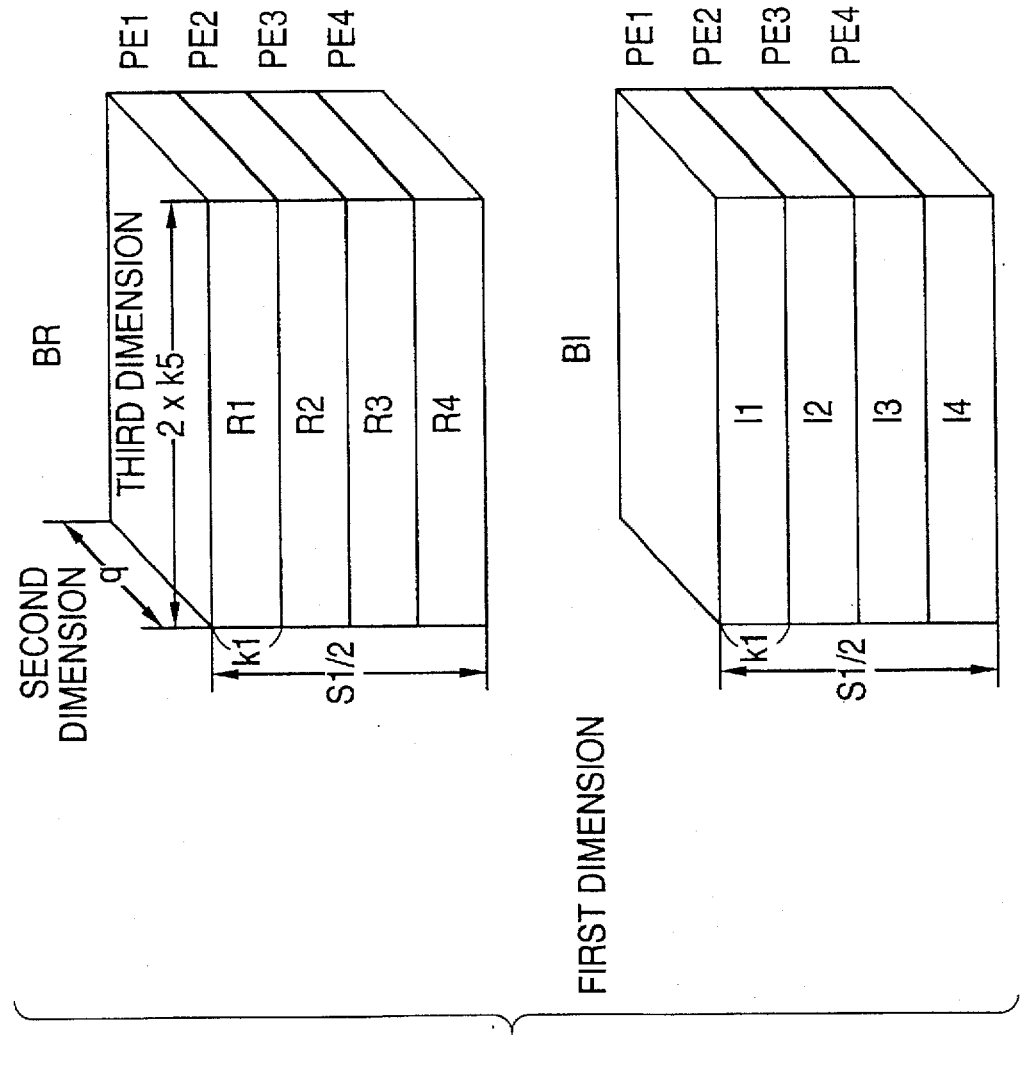
FIG. 20 shows the copy area of the three-dimensional array.

In FIG. 19, a (2×k1, q, k4) is assigned to each of the four processors PE1, PE2, PE3, and PE4, and is divided into the first half and second half. The data in the PE1 is divided into R1 and I1. The data in the PE2 is divided into R2 and I2. The data in the PE3 is divided into R3 and I3. The data in the PE4 is divided into R4 and I4. These data are copied to the arrays BR and BI as shown in FIG. 20. In FIG. 20, the R1, R2, R3, and R4 are stored in the BR as real parts while the I1, I2, I3, and I4 are stored in the BI as imaginary parts. At this time, the BR and BI are used as the arrays BR (s1/2, q, 2×k5) and BI (s1/2, q, 2×k5).

Then, the vector of the third dimension of br (k1, q, 1: k4) is combined with the vector of the third dimension of the corresponding bi (k1, q, 1: k4), and a complex Fourier transformation is performed on the combination in each processor (step S33). That is, assuming that each element of the vector in the direction of the third dimension as one of the br (k 1, q, 1: k4) is $x1_n$ of equation (12), and that the element of the vector in the direction of the third dimension of the bi (k1, q, 1: k4) is $x2_n$ of equation (12), a Fourier transformation is performed on the complex number $z_n$ by equation (13) (where Q=r).

Figure 21:
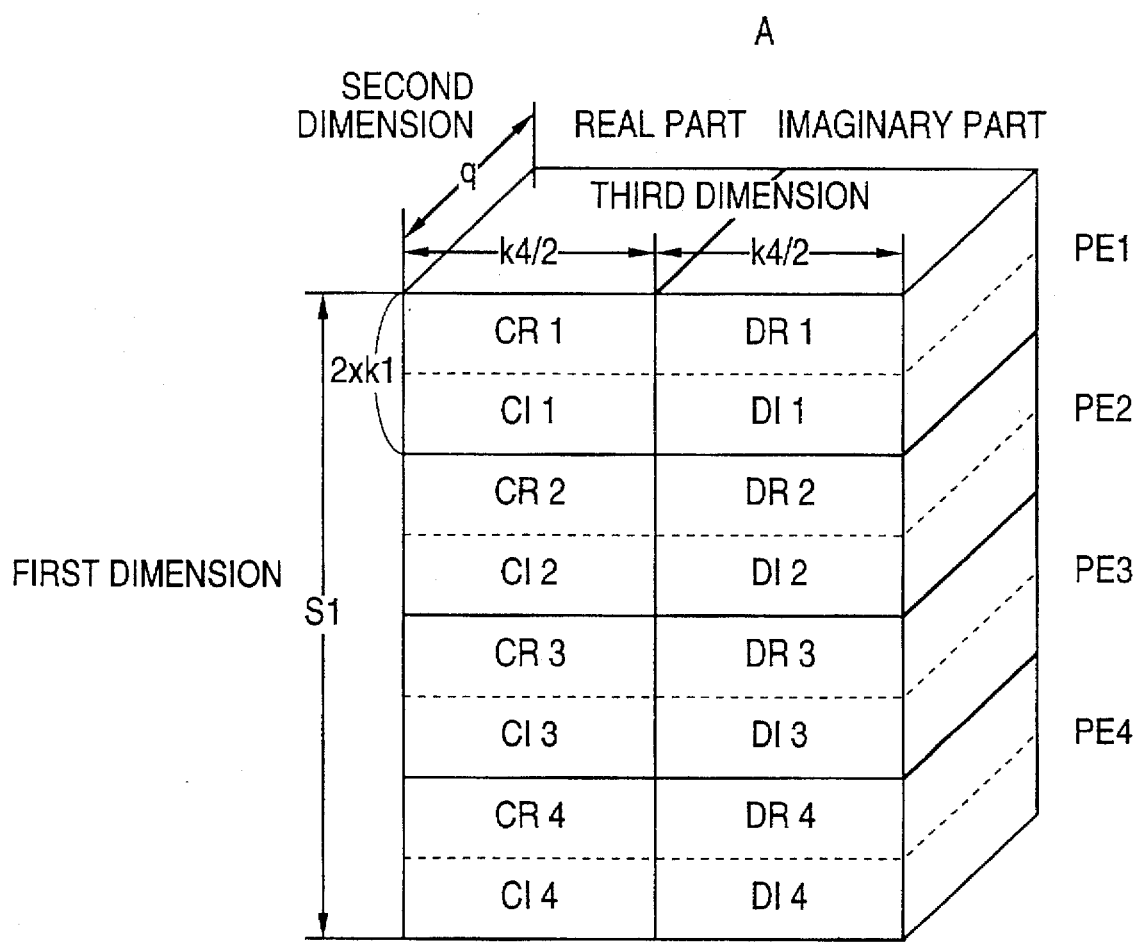
FIG. 21 shows the method of storing the result of a real Fourier transformation in the three-dimensional array.

The results of the first (r/2+1) real Fourier transformations are calculated by equations (16) through (19). The real and imaginary parts are stored in a (2×k1, q, 1 : r/2+1) and a (2×k1, q, r/2+2: k4) (step S34). FIG. 21 shows the storage method. In FIG. 21, the first half of the third dimension of the array A is assigned to the real part while the second half is assigned to the imaginary part. For example, in the processor PE1, the first (r/2+1) results of the real Fourier transformations performed on the vector of the R1 part shown in FIG. 20 are actually obtained, and the real parts of them are stored in the CR1 while the imaginary parts are stored in the DR1. The first (r/2+1) results of the real Fourier transformations performed on the vector of the I1 part shown in FIG. 20 are actually obtained, and the real parts of them are stored in the CI1 while the imaginary parts are stored in the DI1. Data are stored similarly in the areas CR2, DR2, CI2, DI2, CR3, DR3, CI3, DI3, CR4, DR4, CI4, and DI4 in other processors.

Each processor combines the vector in the direction of the second dimension of a (2×k1, q, 1: r/2+1) with the vector in the direction of the second dimension of a (2×k1, q, r/2+2: k4), and performs a Fourier transformation on a complex number of q in length (step S35). The real part and imaginary part of the result are stored in a (2×k1, q, 1: r/2+1) and a (2×k1, q, r/2+2: k4).

Figure 22:
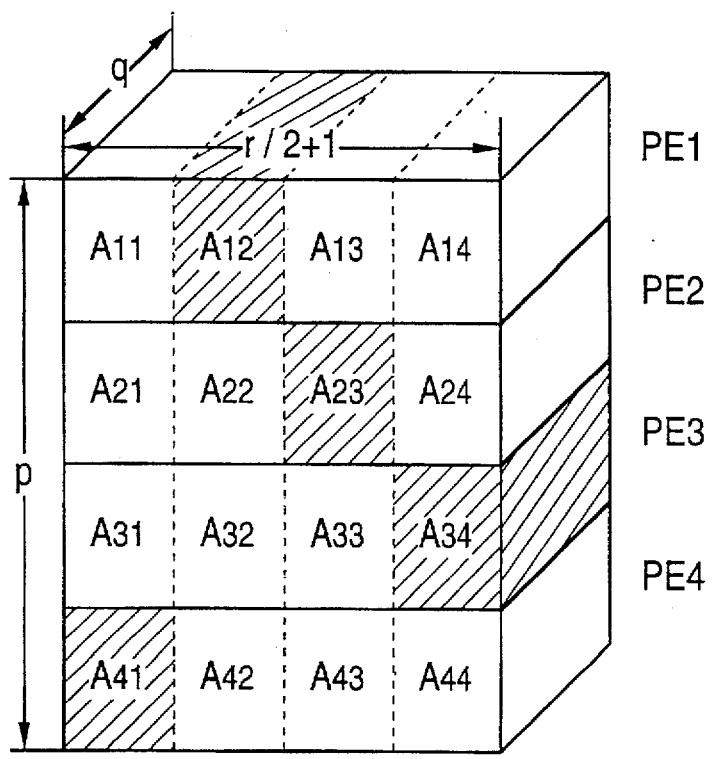
FIG. 22 shows the three-dimensional array before the transposition.
Figure 23:
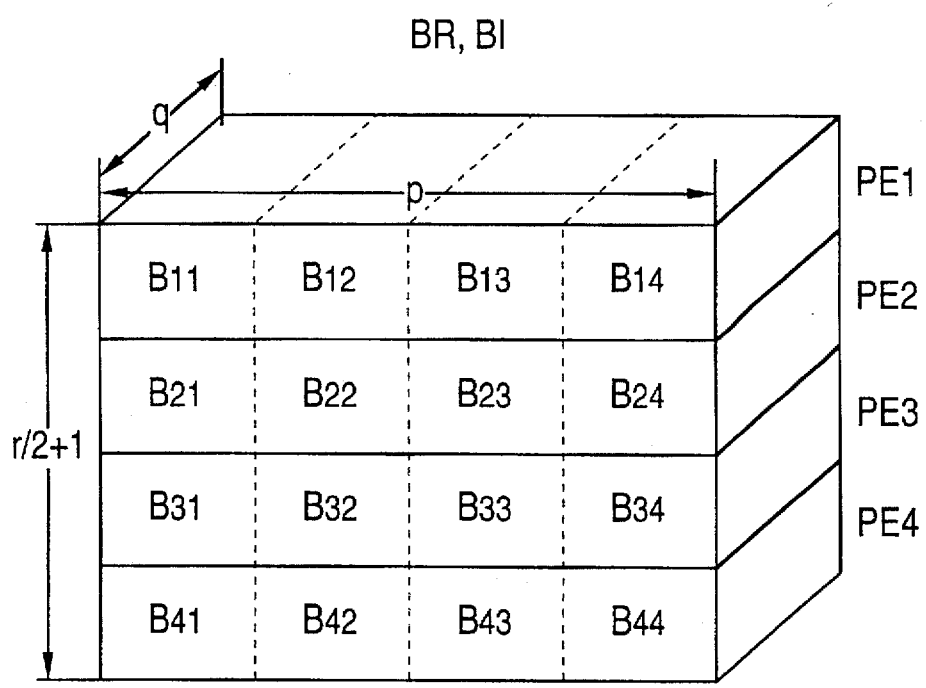
FIG. 23 shows the three-dimensional array after the transposition.

Then, the process at the second stage is performed and the data p×q×(r/2+1)×2 in the array A is divided into blocks. The data is transposed at the block level between the first dimension and the third dimension, and stored in the array B (step S36). At this time, the storage areas BR and BI are used as the arrays BR (k5, q, s1) and BI (k5, q, s1) respectively, and divided for the first dimension. The data transfer between processors allows the data in A (p, q, 1: r/2+1) to be transposed to the BR (1: r/2+1, q, p) and the data in A (p, q, r/2+2: (r/2+1)×2) to be transposed to the BI (1: r/2+1, q, p). The transposing operation performed at this time is the same as that shown in FIG. 7. However, $B_{KJ}$ and $A_{JK}^T$ shown in FIG. 7 refer to the blocks divided from the three-dimensional array for the first and third dimensions. FIG. 22 shows an example of dividing the array A into a real part and an imaginary part before the transposition. FIG. 23 shows an example of dividing the array BR or BI which stores the data after the transposition.

In FIG. 22, the data in the processor PE1 in the real part (or imaginary part) of the array A is divided into four blocks $A_{11}$, $A_{12}$, $A_{13}$, and $A_{14}$. Likewise, the data in the processor PE2 is divided into four blocks $A_{21}$, $A_{22}$, $A_{23}$, and $A_{24}$. The data in the processor PE3 is divided into four blocks $A_{31}$, $A_{32}$, $A_{33}$, and $A_{34}$. The data in the processor PE4 is divided into four blocks $A_{41}$, $A_{42}$, $A_{43}$, and $A_{44}$. In FIG. 23, the data in the processor PE1 in the BR (BI) is divided into four blocks $B_{11}$, $B_{12}$, $B_{13}$, and $B_{14}$. Likewise, the data in the processor PE2 is divided into four blocks $B_{21}$, $B_{22}$, $B_{23}$, and $B_{24}$. The data in the processor PE3 is divided into four blocks $B_{31}$, $B_{32}$, $B_{33}$, and $B_{34}$. The data in the processor PE4 is divided into four blocks $B_{41}$, $B_{42}$, $B_{43}$, and $B_{44}$.

Figure 24:
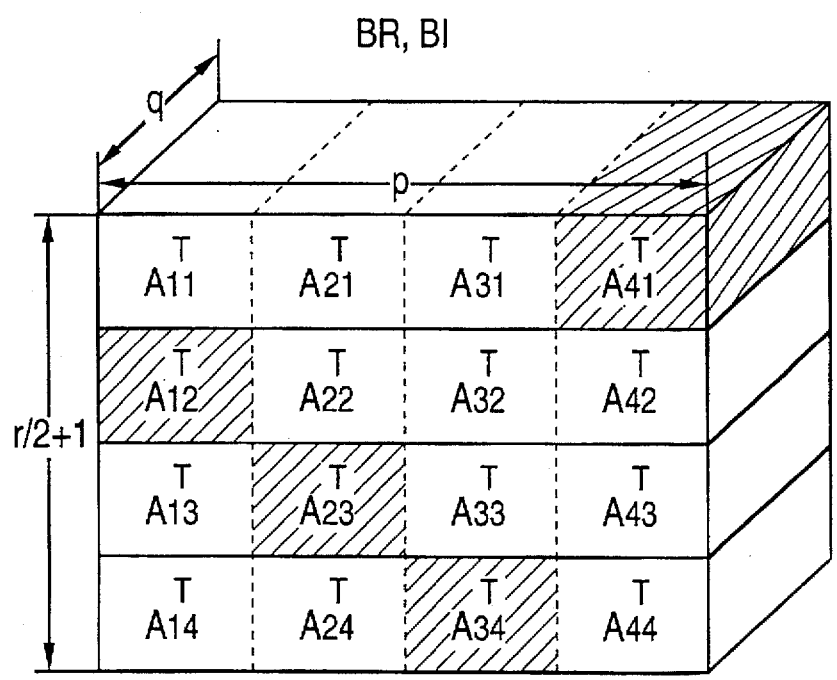
FIG. 24 shows the contents of the two-dimensional array after the transposition.

FIG. 24 shows the contents of the BR (or BI) after the transposing process. In FIG. 24, the processor PE1 stores $A_{11}^T$, $A_{21}^T$, $A_{31}^T$, and $A_{41T}$. The processor PE2 stores $A_{12}^T$, $A_{22}^T$, $A_{32}^T$, and $A_{42}^T$. The processor PE3 stores $A_{13}^T$, $A_{23}^T$, $A_{33}^T$, and $A_{43}^T$. The processor PE4 stores $A_{14}^T$, $A_{24}^T$, $A_{34}^T$, and $A_{44}^T$.

In processing three-dimensional data, the data is transferred in parallel for the block elements arranged in the diagonal direction in the array shown in FIG. 22 as in transferring two-dimensional data shown in FIG. 8. For example, the data $A_{12}^T$, $A_{23}^T$, $A_{34}^T$, and $A_{41}^T$ transposed from the shadowed blocks $A_{12}$, $A_{23}$, $A_{34}$, and $A_{41}$ are transferred in parallel by each of the shadowed blocks shown in FIG. 24.

The process at the third stage is performed in parallel by each processor, and a complex FFT is performed on each of the vectors of the third dimension of p in length as an array transposition result (step S37). The resultant real part and imaginary part of the complex number are stored in the BR (1: r/2+1, q, p) and BI (1: r/2+1, q, p) respectively.

The data are transposed at the block level between the first dimension and third dimension of the arrays stored in the BR and BI, and the transposed data are stored in the array A (step S38). Then, the process terminates. The data transfer performed as in step S36 enables the data in the BR (1: r/2+1, q, p) to be transposed to the A (p, q, 1: r/2+1), and the data in the BI (1: r/2+1, q, p) to be transposed to the A (p, q, r/2+2: (r/2+1)×2).

Of the p×q×r results of the real Fourier transformations, p×q×(r/2+1) results are calculated. Since the results of the three-dimensional Fourier transformation have the conjugation relation as in the case of the one-dimensional real Fourier transformation, the remaining p×q×(r−(r/2+1)) results can be obtained from the calculated results.

As described above, according to the present embodiment, the one- through three-dimensional real Fourier transformations for vector computers are replaced with the complex Fourier transformation in which two real series are regarded as a real part and an imaginary part respectively. Half the results are obtained by each processor of the parallel computer to finally obtain all results. According to the present invention, the applications are not limited to the one- through three-dimensional real Fourier transformations, but can be easily extended to a higher dimensional discrete Fourier transformation. For example, the complex Fourier transformation should be repeatedly performed on the (D−2)th dimension portion in step S35 of the three-dimensional real Fourier transformation shown in FIG. 18 to perform the D-dimensional real Fourier transformation.

According to the present invention, data is divided and distributed in a real Fourier transformation performed by a memory-distributed parallel computer system such the size of one dimension in an array of real numbers to be transformed can be represented by an even number in each processor. Thus, a pair of real number vectors can be prepared in each processor with one of them regarded as a real part and as an imaginary part to perform the Fourier transformation on another dimension in a closed state in the processor. Therefore, the user can make the most of the parallel operations and vector performance.

Furthermore, the use of parallel transposition reduces the data transfer cost and facilitates the entire process.

What is claimed is:

1. A memory-distributed parallel computer for distributing data to memory of a plurality of processors and performing a fast Fourier transformation while transferring data between processors, comprising:

input means for inputting real number data as a first two-dimensional array consisting of a first dimension and a second dimension;

array storage means for dividing the first dimension of the first two-dimensional array by a number of the processors, generating a plurality of subarrays in which the first dimension is even, and distributing the plurality of subarrays for storage in each of the plurality of processors;

first storage means for storing first data after the first dimension of each of the plurality of subarrays is divided into the first data and second data;

second storage means for storing the second data;

calculating means for moving the first and second data from array storage means to said first storage means and second storage means, performing a complex Fourier transformation in each processor on the second dimension with the first data regarded as a real part and the second data regarded as an imaginary part, and obtaining a second transformation result of the Fourier transformation performed on the real number data based on a first transformation result of the complex Fourier transformation; and output means for outputting the second transformation result.

2. The parallel computer according to claim 1, further comprising a transposing means for transposing the two-dimensional array, wherein said calculating means obtains from the first transformation result a part of a third transformation result of a real Fourier transformation performed on the second dimension of the first two-dimensional array, and stores in said array storage means a second two-dimensional array comprising the real part and the imaginary part of the part of the third transformation result;

said transposing means stores the real part and the imaginary part of the part of the third transformation result in said first storage means and second storage means by transposing the second two-dimensional array stored in said array storage means and then storing the array in said first storage means and second storage means;

said calculating means performs the complex Fourier transformation on the first dimension of the second two-dimensional array in each processor using data in said first storage means and second storage means.

3. The parallel computer according to claim 2, wherein said transposing means transposes the second two-dimensional array by dividing the second two-dimensional array into blocks and transferring data in blocks between the processors in parallel.

4. The parallel computer according to claim 2, wherein said transposing means transposes again a third two-dimensional array obtained as a result of the complex Fourier transformation performed on the first dimension of the second two-dimensional array, and stores a transposed array as the second transformation result in said array storage means.

5. The parallel computer according to claim 1, wherein said input means inputs one-dimensional data, when the real number data refers to the one-dimensional data, after converting the one-dimensional data into a format of the first two-dimensional array.

6. The parallel computer according to claim 5, further comprising a transposing means for transposing the two-dimensional array, wherein said calculating means obtains from the first transformation result a part of a third transformation result of a real Fourier transformation performed on the second dimension of the first two-dimensional array, multiplies the part of the third transformation result by a rotation factor, and stores in said array storage means a second two-dimensional array comprising the real part and the imaginary part of a multiplication result;

said transposing means stores the real part and the imaginary part of the part of the third transformation result in said first storage means and second storage means by transposing the second two-dimensional array stored in said array storage means and then storing the array in said first storage means and second storage means;

said calculating means performs the complex Fourier transformation on the first dimension of the second two-dimensional array in each processor using data in said first storage means and second storage means, and obtains the second transformation result.

7. A memory-distributed parallel computer for distributing data to memory of a plurality of processors and performing a fast Fourier transformation while transferring data between processors, comprising:

input means for inputting real number data as a first multiple-dimensional array consisting of a first dimension and a second dimension;

array storage means for dividing the first dimension of the first multiple-dimensional array by a number of the processors, generating a plurality of subarrays in which the first dimension is even, and distributing the plurality of subarrays for storage in each of the plurality of processors;

first storage means for storing first data after the first dimension of each of the plurality of subarrays is divided into the first data and second data;

second storage means for storing the second data;

calculating means for moving the first and second data from said array storage means to said first storage means and second storage means, performing a complex Fourier transformation in each processor on the second dimension with the first data regarded as a real part and the second data regarded as an imaginary part, and obtaining a second transformation result of the Fourier transformation performed on the real number data based on a first transformation result of the complex Fourier transformation; and output means for outputting the second transformation result.

8. A processor for use in a memory-distributed parallel computer system for distributing data to memory of a plurality of processors and performing a fast Fourier transformation while transferring data between processors, comprising:

array storage means comprising a storage area, whose first dimension is even number, for storing, of the real number data input in a format of a multiple-dimensional array comprising a first dimension and a second dimension, partial data assigned after dividing the first dimension by a number of the processors;

first storage means for storing first data after the first dimension of the partial data stored in the storage area is divided into the first data and second data;

second storage means for storing the second data; and calculating means for moving the first and second data from said array storage means to said first storage means and second storage means, performing a complex Fourier transformation on the second dimension with the first data regarded as a real part and the second data regarded as an imaginary part, and obtaining a second transformation result of the Fourier transformation performed on the real number data based on a first transformation result of the complex Fourier transformation.

9. A memory-distributed parallel computer for distributing data to memory of a plurality of processors and performing a fast Fourier transformation while transferring data between processors, comprising:

array storage means for referring to one-dimensional data of N=p×q in length as a first two-dimensional array of p×q, and dividing and distributing a first dimension of the first two-dimensional array so that a size of the first dimension in each processor can be even;

first calculating means for referring to a pair of two-dimensional vectors as a complex number in each processor, performing a complex Fourier transformation, calculating a portion (q/2+1) of the Fourier transformation based on a transformation result, and performing a rotating operation;

transposing means for transposing a result of the rotating operation to a second two-dimensional array of (q/2+1)×p obtained by dividing and distributing the first dimension; and second calculating means for performing in parallel a one-dimensional complex Fourier transformation in each processor on a two-dimensional vector of p in length of the second two-dimensional array, and for obtaining a result of the real Fourier transformation performed on the one-dimensional data.

10. A memory-distributed parallel computer for distributing data to memory of a plurality of processors and performing a fast Fourier transformation while transferring data between processors, comprising:

array storage means for inputting two-dimensional data of (p, q) to a first two-dimensional array of p×q, and dividing and distributing a first dimension of the first two-dimensional array so that a size of the first dimension in each processor can be even;

first calculating means for referring to a pair of two-dimensional vectors as a complex number in each processor, performing a complex Fourier transformation, and calculating a portion (q/2+1) of the Fourier transformation based on a transformation result;

first transposing means for transposing a result of a calculation made by said first calculating means to a second two-dimensional array of (q/2+1)×p obtained by dividing and distributing the first dimension;

second calculating means for performing in parallel a one-dimensional complex Fourier transformation in each processor on a two-dimensional vector of p in length of the second two-dimensional array; and second transposing means for transposing the transformation result the second two-dimensional array to an array of p×(q/2+1) and obtaining a portion of (1: p, 1: q/2+1) of a result of the real Fourier transformation performed on the two-dimensional data.

11. A memory-distributed parallel computer for distributing data to memory of a plurality of processors and performing a fast Fourier transformation while transferring data between processors, comprising:

array storage means for inputting three-dimensional data of (p, q, r) to a first three-dimensional array of p×q×r, and dividing and distributing a first dimension of the first three-dimensional array so that a size of the first dimension in each processor can be even;

first calculating means for referring to a pair of three-dimensional vectors as a complex number in each processor, performing a complex Fourier transformation, calculating a portion (r/2+1) of the Fourier transformation based on a transformation result, and then performing a Fourier transformation on a two-dimensional vector in each processor in parallel;

first transposing means for transposing a result of a calculation made by said first calculating means to a second three-dimensional array of (r/2+1)×q ×p obtained by dividing and distributing the first dimension;

second calculating means for performing in parallel a one-dimensional complex Fourier transformation in each processor on a three-dimensional vector of p in length of the second three-dimensional array; and second transposing means for transposing the transformation result the second three-dimensional array to an array of p×q×(r/2+1) and obtaining a portion of (1: p, 1: q, 1: r/2+1) of a result of the real Fourier transformation performed on the three-dimensional data.

12. A computer-readable storage medium for use with a memory-distributed parallel computer for distributing data to memory of a plurality of processors and performing a fast Fourier transformation while transferring data between processors, to direct the parallel computer to perform the functions of:

inputting real number data as a first multiple-dimensional array consisting of a first dimension and a second dimension;

dividing the first dimension of the first multiple-dimensional array by a number of the processors, thereby generating a plurality of subarrays in which the first dimension is even;

distributing the plurality of subarrays for storage in each of the plurality of processors;

generating first data and second data by dividing the first dimension of each of the plurality of subarrays;

assigning a first storage area for storing the first data and a second storage area for storing the second data;

moving the first and second data to said first storage area and second storage area;

performing a complex Fourier transformation in each processor on the second dimension with the first data regarded as a real part the second data regarded as an imaginary part;

obtaining a second transformation result of the Fourier transformation performed on the real number data based on a first transformation result of the complex Fourier transformation; and outputting the second transformation result.

13. A method of distributing data to memory of a plurality of processors and performing a fast Fourier transformation while transferring data between processors in a memory-distributed parallel computer system, comprising the steps of:

inputting real number data as a first multiple-dimensional array consisting of a first dimension and a second dimension;

dividing the first dimension of the first multiple-dimensional array by a number of the processors, thereby generating a plurality of subarrays in which the first dimension is even;

distributing the plurality of subarrays for storage in each of the plurality of processors;

generating first data and second data by dividing the first dimension of each of the plurality of subarrays;

moving the first and second data to a first storage area and a second storage area;

performing a complex Fourier transformation in each processor on the second dimension with the first data regarded as a real part and the second data regarded as an imaginary part; and obtaining a second transformation result of the Fourier transformation performed on the real number data based on a first transformation result of the complex Fourier transformation.

* * * * *